United States Patent
Tomiyama et al.

(10) Patent No.: US 8,734,669 B2
(45) Date of Patent: May 27, 2014

(54) URETHANE FOAM MOLDED ARTICLE, MANUFACTURING METHOD THEREOF, AND MAGNETIC INDUCTION FOAM MOLDING APPARATUS

(75) Inventors: Koji Tomiyama, Kani (JP); Yasushi Ido, Nagoya (JP)

(73) Assignees: Tokai Rubber Industries, Ltd., Komaki (JP); National University Corporation Nagoya Institute of Technology, Nagoya (JP)

( * ) Notice: Subject to any disclaimer, the term of this patent is extended or adjusted under 35 U.S.C. 154(b) by 908 days.

(21) Appl. No.: 12/230,010

(22) Filed: Aug. 21, 2008

(65) Prior Publication Data

US 2009/0057603 A1 Mar. 5, 2009

(30) Foreign Application Priority Data

Aug. 28, 2007 (JP) ................................. 2007-221783
Nov. 21, 2007 (JP) ................................. 2007-301811
Jan. 31, 2008 (JP) ................................. 2008-020815

(51) Int. Cl.
*C04B 35/04* (2006.01)

(52) U.S. Cl.
USPC ....................................................... 252/62.54

(58) Field of Classification Search
USPC ............ 252/62.54, 62.51 R; 428/36.5, 322.7, 428/219, 319.1
See application file for complete search history.

(56) References Cited

U.S. PATENT DOCUMENTS

| | | | | |
|---|---|---|---|---|
| 4,288,081 A * | 9/1981 | Sado | .............................. | 174/358 |
| 5,522,962 A | 6/1996 | Koskenmaki et al. | | |
| 6,476,113 B1 | 11/2002 | Hiles | | |
| 7,815,998 B2 * | 10/2010 | Simpson et al. | ............ | 428/317.9 |
| 2003/0089881 A1 | 5/2003 | Purizhansky | | |
| 2007/0095499 A1 * | 5/2007 | Tomes et al. | ................... | 164/428 |
| 2008/0213565 A1 * | 9/2008 | Simpson et al. | ............ | 428/319.1 |
| 2008/0233376 A1 * | 9/2008 | Weaver | .......................... | 428/219 |
| 2008/0311378 A1 * | 12/2008 | Simpson | .................... | 428/319.1 |

FOREIGN PATENT DOCUMENTS

| | | |
|---|---|---|
| DE | 3616507 C1 | 7/1987 |
| EP | 1331685 A2 | 7/2009 |
| JP | A-63-130314 | 6/1988 |
| JP | 05-269764 | 10/1993 |

(Continued)

OTHER PUBLICATIONS

Feb. 12, 2010 Extended Search Report issued in European Application No. 08014924.8.

(Continued)

*Primary Examiner* — Emily Le
*Assistant Examiner* — Lynne Edmondson
(74) *Attorney, Agent, or Firm* — Oliff PLC

(57) ABSTRACT

A magnetic induction foam molding apparatus comprising: a pair of electromagnet parts, each of which has a core part composed of a ferromagnet and a coil part placed on the outer circumference surface of the core part, and that are placed so as to face each other and depart from each other with a predetermined distance in the axis direction of the core part; a foaming mold interposed between the pair of electromagnet parts, inside which a cavity is defined; and a yoke part connecting back surfaces of the respective core parts of the pair of the electromagnet pats so as to form a magnetic path between a pair of the back surfaces. In the cavity of the foaming mold, a uniform magnetic field is formed.

4 Claims, 25 Drawing Sheets

(56) References Cited

FOREIGN PATENT DOCUMENTS

| | | |
|---|---|---|
| JP | A-09-271910 | 10/1997 |
| JP | A-2001-287227 | 10/2001 |
| JP | A-2002-011758 | 1/2002 |
| JP | A-2003-097645 | 4/2003 |
| JP | A-2004-255600 | 9/2004 |
| JP | A-2005-048023 | 2/2005 |
| JP | A-2005-104314 | 4/2005 |
| JP | 2006181777 A * | 7/2006 |
| JP | A-2006-181777 | 7/2006 |
| JP | A-2006-326876 | 12/2006 |
| JP | A-2007-230544 | 9/2007 |
| JP | 2008105353 A * | 5/2008 |
| JP | A-2008-105353 | 5/2008 |
| WO | WO 2008074701 A1 * | 6/2008 |

OTHER PUBLICATIONS

Jul. 24, 2010 Office Action issued in Japanese Patent Application No. 2007-301811 (with translation).
Jul. 17, 2012 Office Action issued in Japanese Patent Application No. 2007-301811 (with translation).
Sep. 14, 2012 Office Action issued in European Patent Application No. 08 014 924.8-1253.

* cited by examiner

URETHANE FOAM MOLDED ARTICLE, MANUFACTURING METHOD THEREOF, AND MAGNETIC INDUCTION FOAM MOLDING APPARATUS

INCORPORATION BY REFERENCE

The disclosure of Japanese Patent Application Nos. 2007-221783 filed on Aug. 28, 2007, 2007-301811 filed on Nov. 21, 2007, and 2008-020815 filed on Jan. 31, 2008, including the specification, drawings and abstract is incorporated herein by reference in its entirety.

BACKGROUND OF THE INVENTION

1. Field of the Invention

The present invention relates to a urethane foam molded article used as, for example, an acoustic material or a vibration absorber, a manufacturing method thereof, and a magnetic induction foam molding apparatus suitable for the manufacturing of the urethane foam molded article.

2. Description of the Related Art

The urethane foam molded article is frequently used as a cushion material, an acoustic material, a vibration absorber etc. in various fields such as articles for daily use, automobile, architecture. The urethane foam molded article is usually produced by foam-molding a liquid urethane foam resin raw material in a cavity of a foaming mold (for example, see Japanese Patent Application Publication Nos. 2003-97645, 2005-48023). On the other hand, for eliminating a defect such as an underfill of the urethane foam molded article, Japanese Patent Application Publication No. 2006-181777 disclose a method in which magnetic bodies are blended in a urethane foam resin raw material and a resultant raw material is subjected to foam molding while attracting the magnet body by applying a magnetic field from one direction. In addition, it is not the foam molding, however, as a method for imparting electric conductivity or thermal conductivity to a resin molded article, a method in which powder of metal magnetic bodies is kneaded with a resin and the resin is molded in a magnetic field, is disclosed (for example, see Japanese Patent Application Publication No. 2002-11758).

However, in a conventional molding method utilizing the magnetic field, the distribution of the magnetic force in the cavity of the foaming mold etc. is not taken into consideration. For example, when the molding is performed between the magnets opposed to each other, the closer to the outer circumference of the magnet, the more the lines of magnetic force fleeing outward. Therefore, along the direction of a diameter expansion of the magnet, the magnetic flux density becomes smaller. In addition, when the distance between the magnets becomes larger, according to the distance to a magnet, the difference in the magnetic flux density is likely to be caused. Therefore, it is difficult to apply a uniform magnetic field to the whole of the molding material filled in the cavity. When a molding material to which magnetic bodies are blended is molded in a magnetic field, the magnetic bodies are oriented along the lines of magnetic force. Accordingly, in a magnetic field in which the lines of magnetic force are not uniform and the difference in the magnetic flux density is large, a molded article in which the magnetic bodies are eccentrically-located according to the magnetic flux density is produced.

Accordingly, when the foam molding is performed in a magnetic field in which the magnetic flux density is not uniform and a field gradient is present, the magnetic bodies in a urethane foam resin raw material are moved in an unnecessary direction along the lines of magnetic force, so that a desired oriented state cannot be obtained. Therefore, in a produced urethane foam molded article, desired properties are difficulty obtained. In this case, for example, by increasing the blended amount of the magnetic bodies, the dispersibility of the magnetic bodies can be enhanced. However, the influence on the foam molding becomes larger by the increment of the blended amount of the magnetic bodies. As the result, there is such a fear that various characteristics such as sound absorbing characteristics, heat insulating property and cushion property are lowered. In addition, the weight of the urethane foam molded article is increased, and the manufacturing cost also becomes large.

SUMMARY OF THE INVENTION

The present invention has been developed in view of such circumstances, and it is an object of the present invention to provide a urethane foam molded article in which magnetic bodies are contained in a predetermined oriented state, the manufacturing method thereof and a magnetic induction foam molding apparatus suitable for producing the urethane foam molded article.

(1) According to a first aspect of the present invention, a urethane foam molded article comprising: oriented magnetic bodies; wherein the magnetic bodies are substantially uniformly dispersed in a substantially perpendicular direction to the oriented direction thereof, the magnetic bodies each formed of a number of magnetic body particles or magnetic fillers that are conjoined, connected in a chain shape, and arranged in a line form in the oriented direction.

In the urethane foam molded article of the present invention, it is satisfactory when the magnetic bodies are arranged in a predetermined direction with a certain regularity. The magnetic bodies may be arranged, for example, in a linear form or in a curved form between one end surface and another end surface (the one end surface need not be opposed to the another end surface by 180°). Also, it may be formed in a radiation form from the center toward outer circumference of the molded article. Here, the magnetic bodies are dispersed substantially uniformly in the substantially perpendicular direction to the orientation direction. Since the magnetic bodies are not eccentrically-located in the substantially perpendicular direction to the orientation direction, the orientation effect of the magnetic bodies can be fully exerted, so that desired characteristics corresponding to an oriented state can be obtained. In addition, since the magnetic bodies are dispersed substantially uniformly, even when the content of the magnetic bodies is relatively low, the orientation effect of the magnetic bodies can be obtained.

(2) According to a second aspect of the present invention, a manufacturing method of a urethane foam molded article comprising the steps of: injecting a raw material containing a urethane foam resin raw material and magnetic bodies into a cavity of a foaming mold; and performing a foam molding while applying a magnetic field so that a magnetic flux density in the cavity becomes substantially uniform.

In the foam molding step, the foam molding is performed in a magnetic field in which the magnetic flux density in the cavity becomes substantially uniform. Therefore, the uneven distribution of the magnetic bodies due to the difference in the magnetic flux density can be suppressed, so that a desired oriented state can be obtained. In addition, even when the blended amount of the magnetic bodies is relatively low, the magnetic bodies can be oriented in a substantially uniformly dispersed state. Accordingly, by the manufacturing method of a urethane foam molded article according to the present invention, a urethane foam molded article having desired characteristics can be produced easily and with low cost.

(3) According to a third aspect of the present invention, a magnetic induction foam molding apparatus comprising: a pair of electromagnet parts each of which has a core part composed of a ferromagnet and a coil part placed on the outer circumference surface of the core part, and that are placed so as to face each other and depart from each other with a predetermined distance in the axial direction of the core part; a foaming mold interposed between the pair of electromagnet parts, inside which a cavity is defined; and a yoke part connecting back surfaces of the respective core parts of the pair of electromagnet parts so as to form a magnetic path between a pair of the back surfaces. A uniform magnetic field is formed in the cavity of the foaming mold.

According to the magnetic induction foam molding apparatus of the present invention, in the magnetic circuit constituted with the core parts of the pair of electromagnet parts, the cavity of the foaming mold and the yoke part, the lines of the magnetic force form a closed loop. Therefore, the leakage of the lines of the magnetic force is suppressed, so that a stable uniform magnetic field can be formed in the cavity. In addition, the strength of the magnetic field is easily controlled and the influence on the outside due to the leakage of the lines of the magnetic force is small. In addition, since the leakage of the lines of the magnetic force is suppressed, the waste of the magnetic force is small and the apparatus itself can be downsized. Thus, by the magnetic induction foam molding apparatus of the present invention, a uniform magnetic field can be easily formed in the cavity. Therefore, it is suitable for the manufacturing of the above urethane foam molded article of the present invention.

DETAILED DESCRIPTION OF THE PREFERRED EMBODIMENTS

Figure 1A:
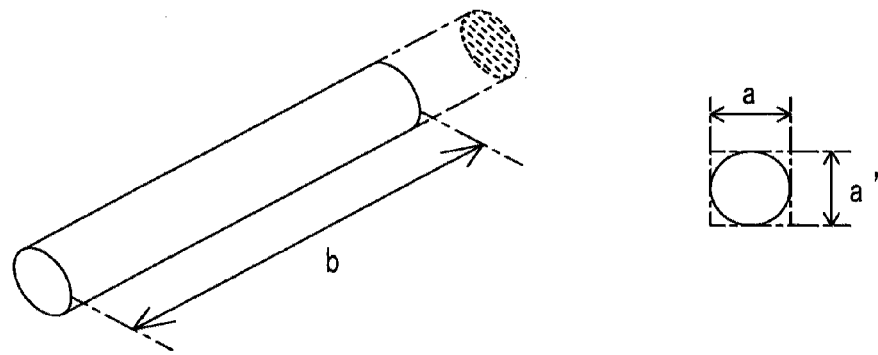
FIGS. 1A to 1C are schematic diagrams for explaining the maximum length and the lengths of the transverse side and longitudinal side of the cross section in the direction perpendicular to the axis in each form of magnetic fillers.

Hereinafter, the urethane foam molded article of the present invention, the manufacturing method thereof and embodiments of the magnetic induction foam molding apparatus are described. Here, the urethane foam molded article of the present invention, the manufacturing method thereof and the magnetic induction foam molding apparatus are not limited by the following embodiments and can be embodied in various forms produced by the alteration, the improvement, or the like of the present invention which one skilled in the art can perform in the range of not departing from the substance of the present invention.

<Urethane Foam Molded Article>

As described above, the urethane foam molded article of the present invention contains oriented magnetic bodies. The magnetic bodies are not particularly limited as long as the magnetic bodies are the so-called magnetic material. Preferred examples thereof include a ferromagnet such as iron, nickel, cobalt, gadolinium and stainless steel; an antiferromagnet such as MnO, $Cr_2O_3$, $FeCl_2$ and MnAs; and alloys using the above magnetic materials. When the heat dissipation properties of the urethane foam molded article will be enhanced, a stainless steel, a copper-iron alloy etc. are suitable. Here, the stainless steel is excellent in rust resistance performance and has a high joint strength with a polyurethane foam. Further, the copper-iron alloy is desirably a eutectic alloy of copper and iron, for example, a semi-hard magnetic copper-iron alloy described in Japanese Examined Patent Application Publication No. 3-064583. Such a copper-iron alloy does not cause the peeling between copper and iron when it is pulverized. Therefore, it possesses both two characteristics such as a high thermal conductivity of copper and a magnetism of iron. Therefore, even when the content thereof is the same as that of other magnetic bodies, it can obtain a heat dissipation effect higher than that of other magnetic bodies.

The size, shape, and the like of the magnetic bodies are not particularly limited. The magnetic bodies may be nanometer-size particles constituting a magnetic fluid (MF), micron-size particle constituting a magnetorheological fluid (MR fluid), and the like. In addition, the magnetic bodies may be also magnetic fillers having various shapes, such as sphere-shape, elliptically spherical shape, elongated sphere-shape (shape formed by connecting two opposite hemispheres with a cylinder), water drop-shape, pole-shape, thin plate-shape, foil-shape, fiber-shape, and needle-shape.

The magnetic fillers have advantageous thermal conductivity. Therefore, when a raw material for the urethane foam molded article contains magnetic fillers as magnetic bodies, the resultant urethane foam molded article becomes excellent in the heat dissipation properties. In addition, when the magnetic fillers have a shape other than sphere, oriented magnetic fillers are contacted with each other not at a point but at least one of a line or face. Therefore, in comparison with the case where the magnetic fillers contact with each other at a point, the contacting area of the magnetic fillers to each other becomes larger. Thus, the heat transfer channel becomes likely to be secured and the amount of transferred heat quantity becomes larger. Therefore, the heat dissipation properties become higher.

In the case of magnetic fillers in a shape other than a sphere-shape, from the viewpoint of enhancing the heat dissipation properties, the aspect ratio of the magnetic filler is desirably 2 or more. In the present specification, the aspect ratio is defined according to the following formula (1):

$$\text{Aspect ratio}=b^2/(a \times a') \qquad \text{Formula (1)}$$

where, b represents the maximum length of the magnetic filler; a represents the length of the transverse side of the cross section in the direction perpendicular to the axis; and a' represents the length of the longitudinal side of the cross section in the direction perpendicular to the axis. Here, the "length of the transverse side of the cross section in the direction perpendicular to the axis" and the "length of the longitudinal side of the cross section in the direction perpendicular to the axis" are determined as follows. In other words, the maximum length b of the magnetic filler is regarded as an axis and a quadrangle in which a cross-sectional shape in the direction perpendicular to the axis is inscribed, is determined, so that the length in the transverse direction of the quadrangle and the length in the longitudinal direction of the quadrangle when the quadrangle is viewed on a plane surface are determined respectively as the "length a of the transverse side of the cross section in the direction perpendicular to the axis" and the "length a' of the longitudinal side of the cross section in the direction perpendicular to the axis". Hereinafter, these determinations are described referring to specific shapes.

Figure 1B:
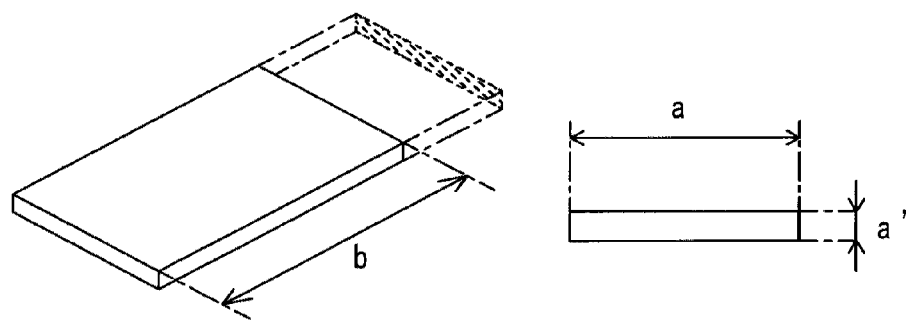
Figure 1C:
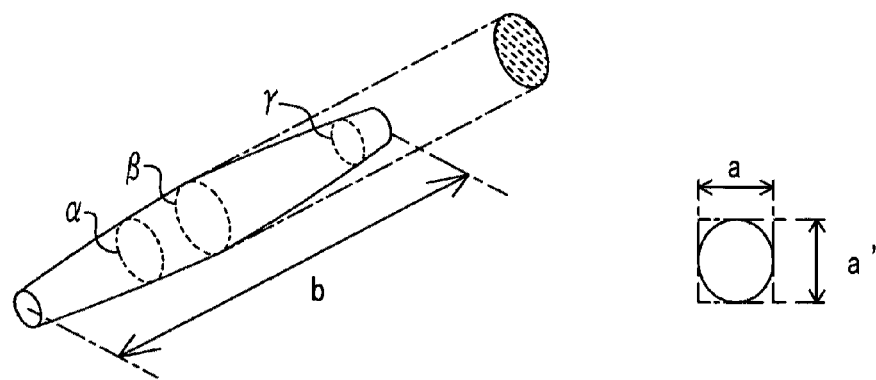

In FIGS. 1A to 1C, the maximum length, the length of the transverse side of the cross section in the direction perpendicular to the axis and the length of the longitudinal side of the cross section in the direction perpendicular to the axis in each shape of the magnetic fillers are shown. FIG. 1A represents the case of a column shape, FIG. 1B represents the case of a thin plate shape and FIG. 1C represents the case of a fiber shape, respectively. Here, the shapes shown in FIGS. 1A to 1C are only for exemplification and the magnetic filler of the present invention is not limited to these examples. First, in the case of a column shape represented by FIG. 1A, the length in the axis direction is the maximum length b. The shape of the cross section in the direction perpendicular to the axis is a circle. The length of the transverse direction of a quadrangle in which the circle is inscribed is the "length a of the transverse side of the cross section in the direction perpendicular to the axis" and the length of the longitudinal direction thereof is the "length a' of the longitudinal side of the cross section in the direction perpendicular to the axis". Next, in the case of a thin plate shape represented by FIG. 1B, the longitudinal direction is the axis direction and the length in the longitudinal direction is the maximum length b. Since the shape of the cross section in the direction perpendicular to the axis is a rectangle, the length in the transverse direction of the rectangle is the "length a of the transverse side of the cross section in the direction perpendicular to the axis" and the length in the longitudinal direction (corresponding to the thickness) of the rectangle is the "length a' of the longitudinal side of the cross section in the direction perpendicular to the axis". Next, in the case of a fiber shape represented by FIG. 1C, the length in the axis direction is the maximum length b. The shape of the cross section in the direction perpendicular to the axis is a substantial ellipse. However, in the case of the fiber shape FIG. 1C, the filler is in a shape of an "elongated barrel" in which the center part in the longitudinal direction is large and the both end part is small. Therefore, in the entire length in the longitudinal direction, the size of the cross section in the direction perpendicular to the axis is not constant. In other words, at the position α, at the position β and at the position γ, the cross section areas of the ellipse are different from each other. In this case, the length in the transverse direction of a rectangle in which the ellipse at the position β of which cross section area becomes maximum is inscribed, is the "length a of the transverse side of the cross section in the direction perpendicular to the axis" and the length in the longitudinal direction thereof is the "length a' of the longitudinal side of the cross section in the direction perpendicular to the axis".

Generally, in the surface of the urethane foam molded article, there is a fine unevenness due to an opening of the cell or the mold surface transcription of the foaming mold. Therefore, when the molded article is contacted with an opposite member, the contacting area becomes small and by just that much, the heat transference thereof becomes lowered. Accordingly, for example, even when the internal heat dissipation properties are enhanced by the orientation of the magnetic fillers, due to a disadvantageous surface condition of the molded article, the heat is unlikely to be transferred between the molded article and an opposite member. For solving such a problem, it is advantageous that the glossiness of the heat transferring surface of the urethane foam molded article of the present invention is caused to be 10% or more. It is more preferred that the glossiness is caused to be 15% or more. Here, the heat transferring surface means a surface of the molded article through which the heat is transferred when the surface is contacted with a surface of an opposite member. The opposite member may be either an exothermic body or a heat absorber. The heat transferring surface is positioned to intersect with the orientation direction of the magnetic bodies. The heat transferring surface may be in the number of one or two or more.

The glossiness is measured according to JIS Z8741 (1997). In other words, the glossiness is measured in a value relative to 100% of a mirror surface glossiness at the incident angle of the light of 60° with respect to a glass surface having a constant value of the refractive index of 1.567 over the whole range of the visible light wavelength. In the present specification, it is regarded that the larger the glossiness is, the lesser the surface unevenness of the heat transferring surface is and the more flat and smooth the heat transferring surface is.

A heat transferring surface having a glossiness of 10% or more has less unevenness and is smoother in comparison with a surface condition of a usual urethane foam molded article. Therefore, the contacting area of the heat transferring surface (heat transfer area) with an opposite member becomes large and the heat quantity transferred between them becomes large. For example, the heat transferred from the opposite member to the heat transferring surface (one end of the molded article) is transferred in the inside of the urethane foam molded article mainly through the magnetic bodies to another end in the orientation direction thereof, and is discharged promptly from the another end. Thus by the urethane foam molded article according to the present mode, the effect of enhancing the heat transference by the internal magnetic bodies can be thoroughly brought out without hindering the effect due to the surface condition of the heat transferring surface. As the result, the heat transference of the whole urethane foam molded article can be more enhanced.

By the way, when a urethane foam resin raw material is subjected to foam molding in a sealed foaming mold, the urethane foam resin raw material is contacted with the mold surface of the foaming mold and the expansion is suppressed, so that a skin layer having a high density is formed. The magnetic bodies or cells generated by the expansion are sealed by the skin layer and are unlikely to emerge to the surface. Accordingly, it is desired to cause the skin layer surface to be the heat transferring surface. The thickness of the skin layer is not particularly limited, however, it may be, for example, 20 μm or less.

In the urethane foam molded article of the present invention, the oriented magnetic bodies are dispersed substantially uniformly in a direction substantially perpendicular to the orientation direction. Examples thereof include a mode in which the magnetic bodies are oriented in a spike-shape in an outer-inner direction from one end surface. According to the present mode, the concentration of the magnetic bodies in the direction substantially perpendicular to the orientation direction hardly differs. That is, the magnetic bodies are dispersed substantially uniformly both in the direction substantially perpendicular to the orientation direction. On the other hand, within the orientation direction, the concentration of the magnetic bodies is varied. Here, the concentration of the magnetic bodies may be varied either gradually smoothly or in a step-shape along the orientation direction. On the contrary, the magnetic bodies may be dispersed substantially uniformly not only in the direction substantially perpendicular to the orientation direction but also in the orientation direction. Namely, the concentration of the magnetic bodies is not varied in the whole urethane foam molded article and the magnetic bodies may be dispersed substantially uniformly. In this case, the orientation condition of the magnetic bodies is substantially uniform in the whole urethane foam molded article.

<Manufacturing Method of Urethane Foam Molded Article>

The manufacturing method of the urethane foam molded article according to the present invention includes a raw material injection step and a foam molding step. Hereinafter, each of these steps is described.

(1) Raw Material Injection Step

The present step is a step for injecting a raw material containing a urethane foam resin raw material and magnetic bodies into a cavity of a foaming mold. The urethane foam resin raw material may be prepared from an already known raw material such as a polyisocyanate component and a polyol component.

The polyisocyanate component may be appropriately selected, for example, from tolylene diisocyanate, phenylene diisocyanate, xylenediisocyanate, diphenylmethanediisocyanate, triphenylmethane triisocyanate, polymethylenepolyphenyl isocyanate, naphthalene diisocyanate, and derivatives thereof (for example, prepolymers, modified polyisocyanates obtained according to a reaction with polyols). Further, the polyol component may be appropriately selected from polyhydroxy compounds, polyetherpolyols, polyesterpolyols, polymerpolyols, polyetherpolyamines, polyesterpolyamines, alkylenepolyols, urea-dispersed polyols, melamine-modified polyols, polycarbonatepolyols, acrylpolyols, polybutadienepolyols, phenol-modified polyols etc.

Further, to the urethane foam resin raw material, a catalyst, a blowing agent, a foam stabilizer, a crosslinker, a flame retardant, an antistatic agent, a viscosity depressant, a stabilizer, a filler, a colorant etc. may be appropriately blended. Examples of the catalyst include amine-based catalysts such as tetraethylenediamine, triethylenediamine, dimethylethanolamine, and organometallic catalysts such as tin laurate and tin octanoate. In addition, as the blowing agent, water is suitable. Examples of the blowing agent besides water include methylene chloride, chlorofluorocarbon and $CO_2$ gas. Further, as the foam stabilizer, a silicone-based foam stabilizer is suitable and as the crosslinker, triethanolamine, diethanolamine etc. are suitable.

The raw material injected into the cavity of the foaming mold contains the above urethane foam resin raw material as an essential component and can employ various modes. For example, when the above-described magnetic fillers are used as the magnetic bodies, the raw material may be a mixed material produced by mixing the urethane foam resin raw material and the magnetic fillers (first mode). In this case, the blended amount of the magnetic fillers may be appropriately determined taking into consideration the effect of enhancing the heat dissipation properties, the sound absorbing properties, the cost etc. For example, from the view point of enhancing the heat dissipation properties, the blended amount of the magnetic fillers is desirable to be 0.1 volume % or more relative to 100 volume % of the volume of the urethane foam molded article. The blended amount is more preferred to be 1 volume % or more. On the other hand, taking into consideration the influence on the dispersibility of the magnetic fillers, the sound absorbing properties etc., the blended amount of the magnetic fillers is desirable to be 20 volume % or less. The blended amount is more preferred to be 3 volume % or less.

In addition, a urethane foam molded article in which the properties in the orientation direction of the magnetic bodies and the properties in a direction crossing the orientation direction differ from each other is suitable in an application for which anisotropy is required. A urethane foam molded article having anisotropy can be so constituted that for example, it has an foamed main body having holes oriented in such a way that the holes communicate from one end to another end of the foamed main body. In this case, from the load-displacement curve for the urethane foam molded article, the static spring constant in the orientation direction of the hole is desired to be two times or more, preferably four times or more, more preferably ten times or more the static spring constant in a direction substantially perpendicular to the orientation direction. Here, in the present specification, the static spring constant is defined to be a value calculated by dividing the load by the displacement when the sample of 20 mm in thickness is compressed in the thickness direction in an amount of 2 mm (10%).

When such a urethane foam molded article is produced, the above-described raw material may be a mixed material produced by mixing the urethane foam resin raw material and a magneto-suspension (second mode). In the present mode, the "magneto-suspension" means not only the above-described MR fluid, but also more widely the "fluid in which fine particles of the magnetic bodies are dispersed in a solvent". Accordingly, the "magneto-suspension" includes besides the MR fluid containing magnetic body particles having a micron size, the magnetic compound fluid (MCF) produced by mixing the magnetic fluid (MF) containing magnetic body particles having a nanometer size with magnetic body particles having a micron size etc. The magnetic compound fluid (MCF) referred to as here is, for example, like a particles dispersed-type mixed functional fluid described in Japanese Patent Application Publication No. 2002-170791. As a commercially available "magneto-suspension", for example, a product "E-600" (manufactured by Sigma Hi-Chemical Inc.) and products "MRF-122-2ED", "MRF-132DG" and "MRF-140CG" (manufactured by Lord Corporation) etc. can be used.

When a magnetic field is applied to the magneto-suspension, dispersed magnetic body particles couple on each other along the direction of the magnetic field to form a cluster in a chain shape. Thus, the viscosity of the magneto-suspension is rapidly elevated. During the foam molding in the magnetic field, the magneto-suspension is thickened and is oriented in the direction of the magnetic field, that is in the direction from one end to another end of the foaming mold. This will be described later.

From the viewpoints of enhancing the foaming performance, producing a lighter urethane foam molded article etc., it is desirable that a content of an additive hindering the expansion (for example, a stabilizer having an effect of braking foam) is small in a magneto-suspension. In addition, the magnetic body particles are desirably dispersed substantially uniformly in a solvent. For satisfying such a requirement, for example, it is advantageous that the magneto-suspension is constituted by incorporating a solvent, magnetic body particles dispersed in the solvent and an antisettling agent for suppressing the settling of the magnetic body particles into the solvent. Here, in the magneto-suspension of the present constitution, other additives (for example, a colorant), which do not hinder the expansion, may also be blended. According to the present constitution, in comparison with the case where the above MR fluid or MCF is used, the rate of the expansion can be enhanced, as well as, for example, a light urethane foam molded article having a density of 0.2 g/cm³ or less can be produced. Further, when the magneto-suspension is constituted only of a solvent, magnetic body particles dispersed in the solvent and an antisettling agent for suppressing the settling of the magnetic body particles, it is preferred that the urethane foam molded article is weight-saved and the cost is lowered.

Here, examples of the solvent for dispersing the magnetic body particles therein include an oil-based solvent such as kerosene, isoparaffin, poly-α-olefin. Among them, from such a reason that it is unlikely to be vaporized in a normal temperature or higher temperatures atmosphere, poly-α-olefin is preferred. In addition, as the antisettling agent, smectite etc. is preferred.

The particle diameter of the magnetic body particle is desirably 1 μm or more and 10 μm or less. Here, the maximum diameter of the magnetic body particle is adopted as the particle diameter thereof. As described in detail later, during the foam molding step, air bubbles are generated in the urethane foam resin raw material. The magneto-suspension enters a film of air bubbles (bubble film) and controls the flow of a bubble film becoming a skeleton of a cell under the action of the magnetic field (see FIGS. 2A and 2B to be mentioned later). When the particle diameter is less than 1 μm, the influence of the magnetic body particles on the bubble film during the application of the magnetic field becomes small. Therefore, it is difficult to control the bubble film. On the other hand, when the particle diameter is more than 10 μm, the solvent and the magnetic body particles are separated from each other, so that the magnetic body particles become likely to be settled. Therefore, it is feared that only the magnetic body particles are oriented and it becomes difficult to control the bubble film.

The blended amount of the magneto-suspension relative to the urethane foam resin raw material may be appropriately adjusted for forming a desired hole and taking into consideration the physical properties of the obtained urethane foam molded article. For example, for securing the responsivity of the urethane foam molded article to the magnetic field, it is desirable to blend the magneto-suspension in an amount of 10 parts by weight or more, more preferably 15 parts by weight or more relative to 100 parts by weight of the total of a polyisocyanate component and a polyol component. On the contrary, taking into consideration the physical properties or influence on the reaction condition of the urethane foam molded article, it is desirable to blend the magneto-suspension in an amount of 70 parts by weight or less, more preferably 40 parts by weight or less relative to 100 parts by weight of the total of a polyisocyanate component and a polyol component.

Both of the urethane foam resin raw material and the magneto-suspension constituting the mixed material are liquid. Therefore, the mixed condition of the urethane foam resin raw material and the magneto-suspension is advantageous. Thus, disadvantages such as the settling and the dispersibility failure of the powder particles, which are likely to occur when powder of magnetic bodies is used, are not caused. In addition, these raw material components are easily handled and the load thereof to the facility is small.

In addition, when a urethane foam molded article having different property depending on the orientation direction of the magnetic bodies is produced, the above raw material may be constituted of the urethane foam resin raw material and at least one magnetic body-containing fluid selected from MF, MR fluid and MCF. Then, the urethane foam resin raw material and the magnetic body-containing fluid are not mixed, but may be separately injected into the cavity (third mode). For example, when before the urethane foam resin raw material is injected, the magnetic body-containing fluid is injected into the bottom part of the cavity beforehand, the magnetic bodies contained in the magnetic body-containing fluid are oriented from the surface of the laid-down magnetic body-containing fluid along the direction of the lines of the magnetic force. Thus, along the orientation direction of the magnetic bodies, the cell structure can be varied.

As MF, MR fluid and MCF used in the present mode, those by which the solvent dispersing the magnetic bodies is likely to influence on the expansion reaction of the urethane foam resin raw material are desirable to be used. Examples of such a fluid include water, poly-α-olefin. Particularly, at least any one of MR fluid and MCF can be advantageously used. MR fluid and MCF influence largely on the expansion reaction of the urethane foam resin raw material. That is, when the magnetic field is applied to MR fluid or MCF, the viscosity thereof is rapidly elevated. Therefore, during the foam molding in the magnetic field, MR fluid or MCF is orientation-flowed earlier than the expansion reaction of the urethane foam resin raw material to arrest the urethane foam resin raw material. Thus, the expansion reaction becomes unlikely to progress. As the result, a cell structure of the part on which MR fluid or MCF has acted can be largely changed.

As described above, three modes of the raw material constitution have been exemplified. The foaming mold closed by injecting a predetermined raw material thereinto is swiftly subjected to the next foam molding step. Actually, for causing the magnetic bodies to bring out thoroughly the heat transference enhancing effect, the heat transferring surface of the urethane foam molded article is desirably smooth as much as possible. As a method for molding a smooth heat transferring surface, for example, a method for foam molding while applying a mold releasing agent such as a silicone grease to the mold surface of the foaming mold can be considered. However, when the mold releasing agent is used, the mold releasing agent is attached to the surface of the obtained urethane foam molded article, which is feared to affect the properties of the urethane foam molded article such as sound absorbing properties. In addition, there is also such a fear that the attached mold releasing agent is deteriorated to cause a defect. Further, there is such a fear that due to the unevenness in applying the mold releasing agent etc., the surface condition of the heat transferring surface gets worse contrarily. In addition, due the material cost of the mold releasing agent, the addition of the applying process and the like, the manufacturing cost becomes enlarged.

Thus, in the foaming mold, it is desirable to cause the heat transfer surface-molding mold surface for molding the heat transferring surface of the urethane foam molded article to have a surface roughness of 0.5 μm or less. In other words, it is satisfactory that among the mold surfaces of the foaming mold, at least apart molding the heat transferring surface (heat transfer surface-molding mold surface) has a surface roughness of 0.5 μm or less. Here, it is no problem when the entire mold surface of the foaming mold has a surface roughness of 0.5 μm or less. The heat transfer surface-molding mold surface has a surface roughness of preferably 0.3 μm or less, more preferably 0.1 μm or less. In the present specification, as the surface roughness, the value of an arithmetic average roughness (Ra) calculated according to JIS B0601(2001) is adopted.

By causing the heat transfer surface-molding mold surface of the foaming mold to have the surface roughness of 0.5 μm or less, a smooth heat transferring surface having small unevenness can be molded. In other words, for example, a urethane foam molded article equipped with a heat transferring surface having a glossiness of 10% or more can be easily obtained. In addition, since the mold releasing agent is not necessary to be used, there is not the above described problem due to the attached mold releasing agent and the like.

Such a foaming mold can be obtained, for example, by subjecting the heat transfer surface-molding mold surface to a surface treatment such as polishing. In addition, it is also satisfactory to use a resin film for mold releasing. In other words, it is satisfactory to place a resin film for mold-releasing having a surface roughness of 0.5 μm or less along the mold surface of the foaming mold including at least the heat transfer surface-molding mold surface. In this case, the heat transfer surface-molding mold surface is formed according to the resin film for mold releasing. By using the resin film for mold releasing, the existing foaming mold can be used as it is. In addition, the mold releasing agent is not necessary to be applied.

The resin film for mold releasing is desirably unlikely to be attached to the urethane foam molded article. Examples thereof include films of polyethylene terephthalate (PET), polyester, polyethylene (PE), polypropylene (PP), silicone resin, polytetrafluoroethylene (PTFE) and the like. The resin film for mold-releasing may be obtained by cutting a commercially available one or by molding one having a predetermined mold surface-shape according to a known method such as vacuum molding, injection molding, and blow molding.

(2) Foam Molding Step

The present step is a step for foam molding while applying the magnetic field so that the magnetic flux density in the cavity of the foaming mold becomes substantially homogeneous. For example, when the magnetic bodies are oriented in a straight shape, it is desirable that the lines of magnetic force in the cavity are formed to become substantially parallel to each other from one end to another end of the cavity. In this case, for example, magnets may be placed around one end surface and another end surface of the foaming mold respectively as they sandwich the foaming mold. As the magnet, a permanent magnet or an electromagnet may be used. When the electromagnet is used, the On-Off of the magnetic field formation can be instantaneously switched, so that the strength of the magnetic field can be easily controlled. Therefore, the foam molding is easily controlled. Here, the lines of magnetic force constituting the magnetic field form desirably a closed loop. Thus, the leakage of the lines of magnetic force is suppressed and a stable uniform field can be formed in the cavity. Here, it is advantageous that a foaming mold that is made of a material having low magnetic permeability, that is, made of a non-magnetic material, is used for causing the magnet placed outside the foaming mold to form the magnetic field inside the foaming mold. For example, it is no problem that the foaming mold is that made of aluminum or an aluminum alloy used usually for the foam molding of polyurethane. In this case, the magnetic field and the lines of magnetic force generated from a magnetic force source such as an electromagnet are unlikely to be influenced and the magnetic field condition can be easily controlled. However, corresponding to the condition of necessary magnetic field/lines of magnetic force, the foaming mold made of a magnetic material may be also used.

In the present step, the magnetic flux density in the cavity is substantially uniform. For example, the deviation of the magnetic flux density in the cavity is preferably within +10%, more preferably within ±5%, further preferably within ±3%. By forming a uniform magnetic field in the cavity of the foaming mold, an uneven distribution of the magnetic bodies can be suppressed and a desired orientation condition can be obtained.

The magnetic field is desirably applied while the viscosity of the urethane foam resin raw material is yet relatively low. When the magnetic field is applied at the time the urethane foam resin raw material becomes thickened and the foam molding is completed to a certain extent, the magnetic bodies are unlikely to be oriented, so that desired properties of the urethane foam molded article can be difficulty obtained. Here, it is not necessary to apply the magnetic field over all time for the foam molding.

For example, when in the above step for injecting the urethane foam resin raw material, a raw material according to the first mode is employed, magnetic fillers dispersed in the urethane foam resin raw material are coupled on each other along the direction of the magnetic field during the foam molding and are oriented.

Figure 2A:
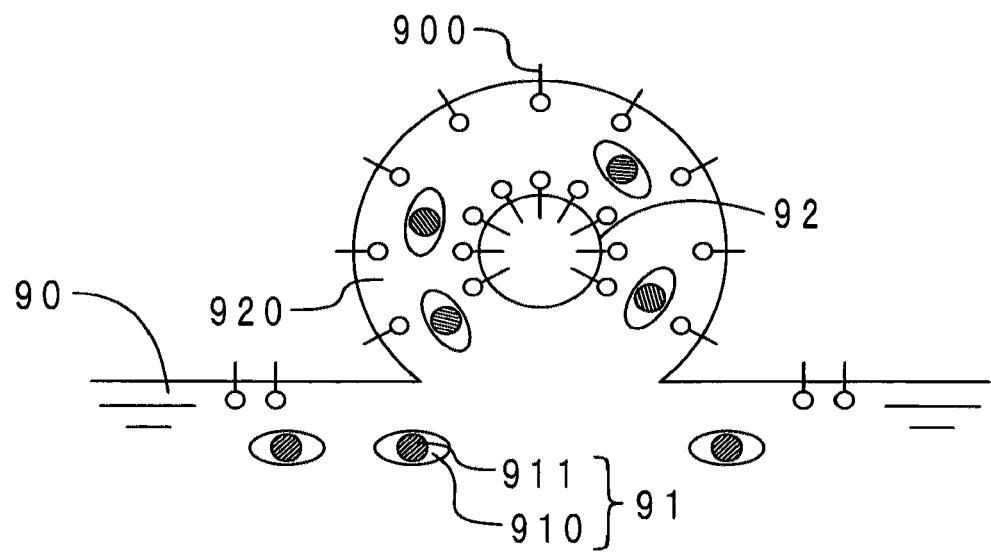
FIGS. 2A and 2B are model views showing part of the reaction in a foam molding step in the case where a mixed material in which a magneto-suspension is blended is used.
Figure 2B:
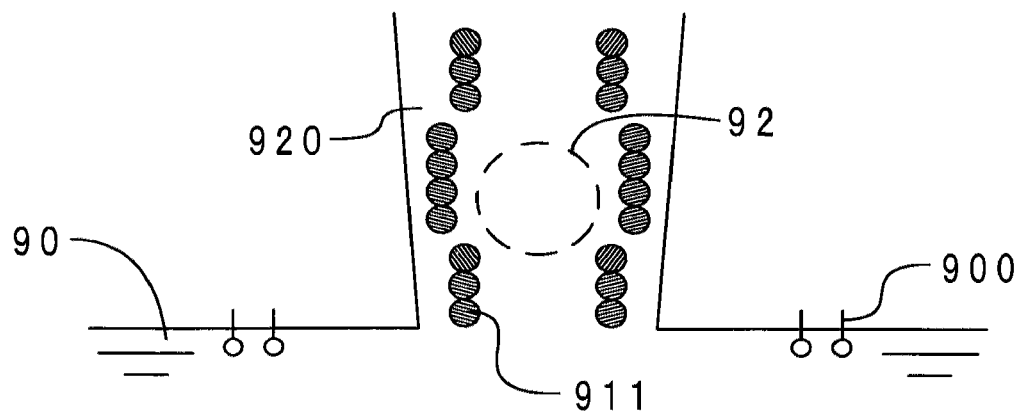

In addition, when a raw material according to the second mode is employed, as described above, during the foam molding, the magneto-suspension becomes thickened and is oriented in the direction of the magnetic field. In this case, the reaction in the foam molding step is considered as follows. In FIGS. 2A and 2B, a part of the reaction in the foam molding step according to the present mode is shown as a model figure. As shown in FIG. 2A, in the foam molding step, an air bubble 92 is generated in a urethane foam resin raw material 90. The surface of a film (bubble film) 920 of the air bubble 92 is stabilized by a foam stabilizer 900 contained in the urethane foam resin raw material 90. In the urethane foam resin raw material 90, a magneto-suspension 91 is incorporated. The magneto-suspension 91 is produced by dispersing magnetic body particles 911 in a solvent 910. When the air bubble 92 is generated, the magneto-suspension 91 enters the bubble film 920. In other words, by the assistance of the solvent 910 as a carrier, the magnetic body particles 911 enter the bubble film 920. On the other hand, the solvent 910 has a bubble breaking action. Therefore, by the solvent 910 which has entered the bubble film 920, the air bubble 92 becomes broken as shown in FIG. 2B. Here, when the magnetic field is applied (in FIG. 2B, the magnetic field is in the upper-lower direction), by the orientation of the magnetic body particles 911, the bubble film 920 flows, so that the skeleton of the urethane foam molded article is formed. As the result, a hole oriented to communicate from one end to another end is formed.

The hole is oriented in the same direction as the orientation direction of the magnetic bodies contained in the magneto-suspension. It is satisfactory when the hole communicates from one end to another end and it is no problem that individual holes communicate to each other in the middle way. In addition, the shape, size and number per unit area etc. of the hole (opening) emerging out of the end surface are not particularly limited. Since these items can be controlled by the raw material, the method and condition of the expansion etc., they may be appropriately controlled according to the application.

In addition, when a raw material according to the third mode is employed, the magnetic bodies contained in the magnetic body-containing fluid are oriented in the direction of the magnetic field during the foam molding, so that the magnetic body-containing fluid flows. In the above raw material injecting step, the urethane foam resin raw material and the magnetic body-containing fluid are not mixed and are separately injected into the cavity. Therefore, a part of the urethane foam resin raw material closer to the magnetic body-containing fluid is foamed while arrested by the orientation-flowing magnetic body-containing fluid. At this time, the higher the concentration of the magnetic body-containing fluid is, the larger the influence on the expansion reaction is. Accordingly, depending on the degree of the influence by the magnetic body-containing fluid on the expansion reaction, the formed cell structure is changed. In addition, by the type and amount of the magnetic body-containing fluid, the strength of the magnetic field etc., the cell structure can be easily controlled.

In the present step, after the completion of the expansion reaction, by removing the mold, the urethane foam molded article of the present invention is obtained. At this time, according to the way of foam molding, a skin layer is formed at least one of one end and another end of the urethane foam molded article. The skin layer may be cut off according to the application (of course, is not have to be cut off).

<Magnetic Induction Foam Molding Apparatus>

Figure 3:
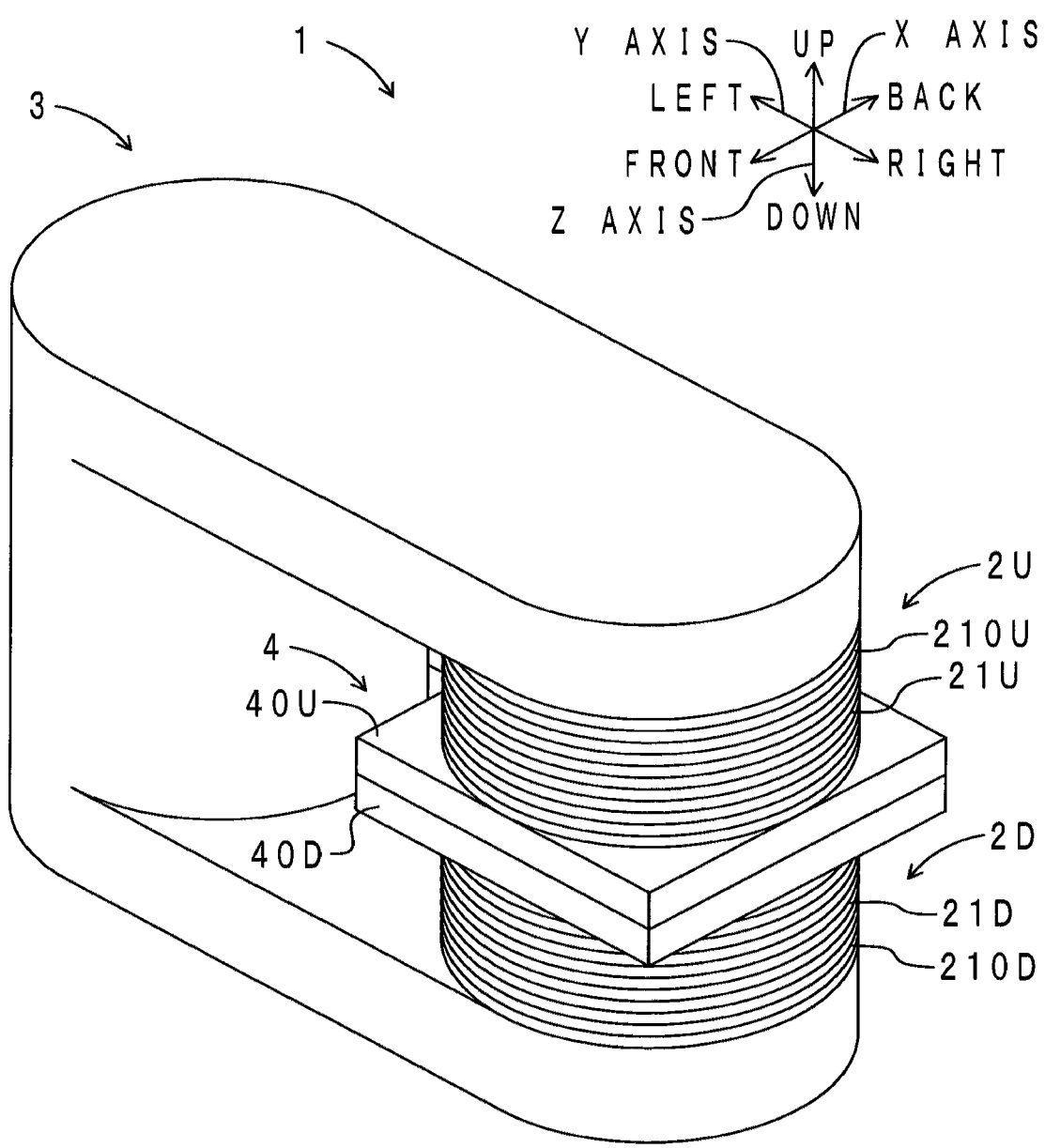
FIG. 3 is a perspective view of a magnetic induction foam molding apparatus according to an embodiment of the present invention.
Figure 4:
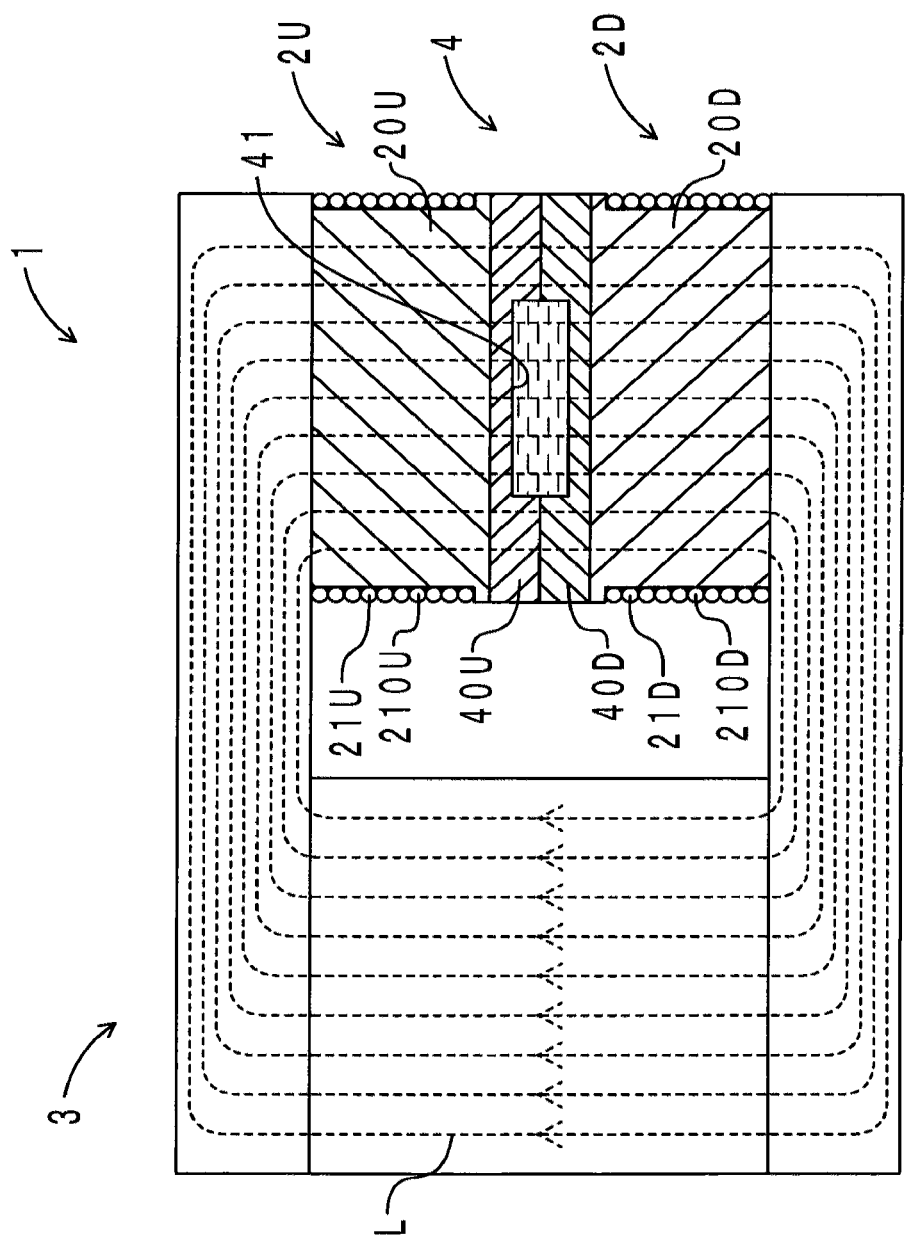
FIG. 4 is a partial cross-sectional view of the above magnetic induction foam molding apparatus.

Hereinafter, one embodiment of the magnetic induction foam molding apparatus of the present invention will be described. First, a constitution of the magnetic induction foam molding apparatus of the present embodiment is described. FIG. 3 is a perspective view of the magnetic induction foam molding apparatus. FIG. 4 is a partial cross-sectional view of the magnetic induction foam molding apparatus. As shown in FIGS. 3 and 4, a magnetic induction foam molding apparatus 1 includes a pair of electromagnet parts 2U, 2D, a yoke part 3 and a foaming mold 4.

The electromagnet part 2U includes a core part 20U and a coil part 21U. The core part 20U is made of a ferromagnet and is in a columnar shape extending in the upper-lower direction. The coil part 21U is arranged on the outer circumference surface of the core part 20U. The coil part 21U is formed with a conducting wire 210U wound on the outer circumference surface of the core part 20U. The conducting wire 210U is connected to the power source (not shown).

The electromagnet part 2D is placed under the electromagnet part 2U, sandwiching the foaming mold 4 therebetween. The electromagnet part 2D has the same constitution as that of the electromagnet part 2U. In other words, the electromagnet part 2D includes a core part 20D and a coil part 21D. The coil part 21D is formed with a conducting wire 210D wound on the outer circumference surface of the core part 20D. The conducting wire 210D is connected to the power source (not shown).

The yoke part 3 is C-shaped. The upper end of the C-shape of the yoke part 3 is connected to the upper end of the core part 20U of the electromagnet part 2U. On the other hand, the lower end of the C-shape of the yoke part 3 is connected to the lower end of the core part 20D of the electromagnet part 2D.

The foaming mold 4 includes an upper mold 40U and a lower mold 40D. The foaming mold 4 is interposed between the core part 20U of the electromagnet part 2U and the core part 20D of the electromagnet part 2D. The upper mold 40U is in a prism-shape. On the bottom surface of the upper mold 40U, a concave portion in a cylinder-shape is formed. Similarly, the lower mold 40D is in a prism-shape. On the top surface of the lower mold 40D, a concave portion in a cylinder-shape is formed. The upper mold 40U and the lower mold 40D are arranged so that the openings of the concave portions of both molds 40U, 40D face each other. Between the upper mold 40U and the lower mold 40D, by uniting the above concave portions, a cavity 41 is defined. In the cavity 41, a predetermined raw material is filled.

Next, an operation of the magnetic induction foam molding apparatus of the present embodiment is described. When the power source connected to the conducting wire 210U and the power source connected to the conducting wire 210D are turned on, the upper end of the core part 20U of the upper electromagnet part 2U is magnetized to the South Pole and the lower end thereof is magnetized to the North Pole. Therefore, in the core part 20U from upper to lower, lines of magnetic force L (shown with a dotted line in FIG. 4) are generated. In addition, the lower end of the core part 20D of the lower electromagnet part 2D is magnetized to the South Pole and the lower end thereof is magnetized to the North Pole. Therefore, in the core part 20D from upper to lower, the lines of magnetic force L are generated. In addition, the lower end of the core part 20U is the North Pole and the upper end of the core part 20D is the South Pole. Therefore, between the core part 20U and the core part 20D, from upper to lower, the lines of magnetic force L are generated. As described above, the foaming mold 4 is interposed between the core part 20U and the core part 20D. Therefore, in the cavity 41 of the foaming mold 4, a uniform magnetic field is formed from upper to lower by the substantially parallel lines of magnetic force L.

Figure 5:
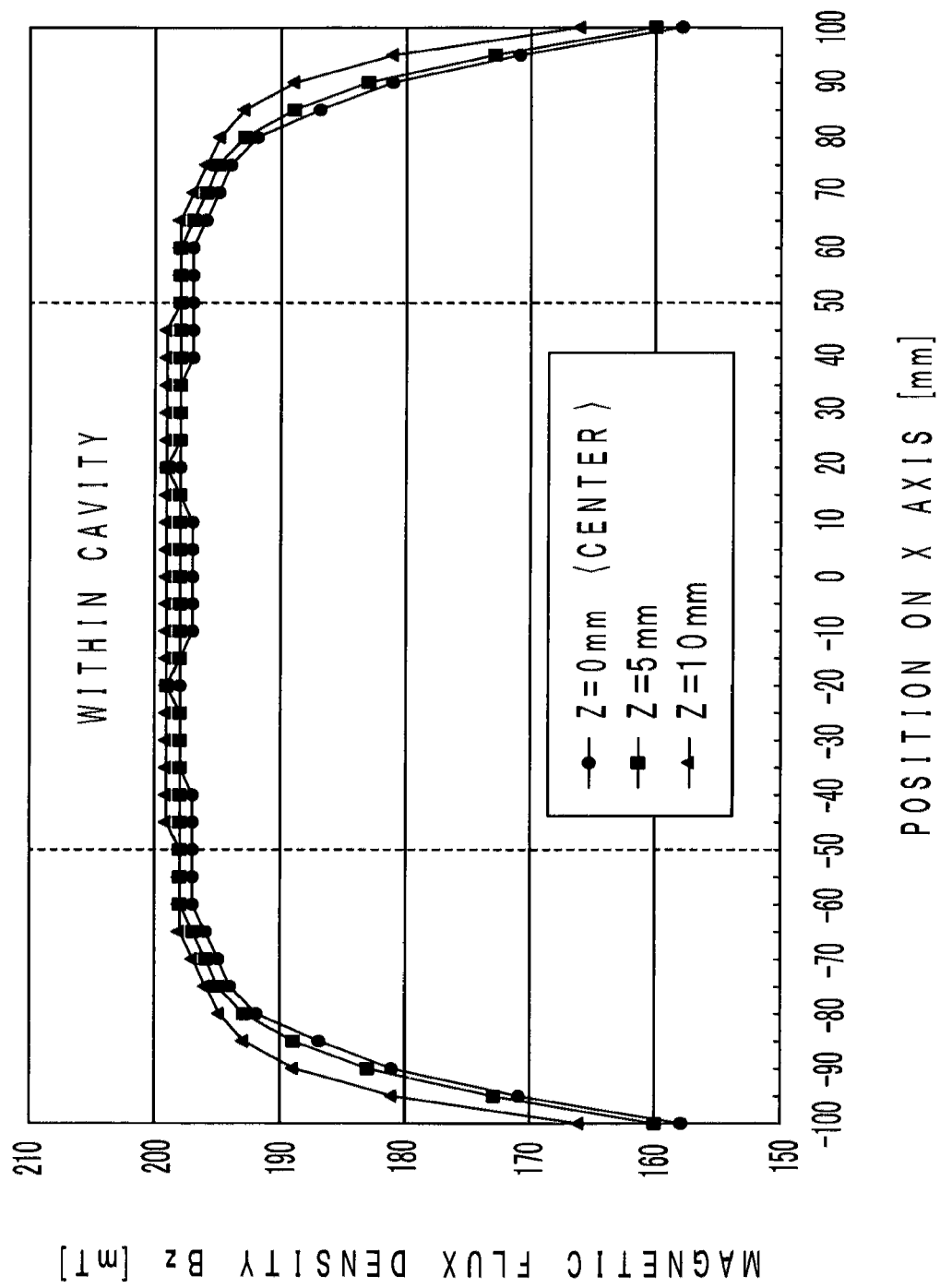
FIG. 5 is a graph showing one example of the result of measuring the magnetic flux density in the cavity of a foaming mold.

In FIG. 5, as one example of the formed uniform magnetic field, the result of measuring the magnetic flux density in the cavity 41 is shown. Here, the coordinate axis in the cavity 41 was defined as follows. As the direction is shown in the above FIG. 3, relative to the center of the cavity 41 as the origin of coordinates, the upper-lower direction has been defined as the Z axis, the front-back direction as the X axis and the left-right direction as the Y axis. The magnetic flux density was measured in the X and Y axes directions. In addition, in FIG. 5, the section between the positions on the X axis −50 mm and 50 mm is within the cavity 41. As shown in FIG. 5, the deviation of the magnetic flux density in the Z axis direction (direction of the lines of magnetic force L) relative to the standard magnetic flux density at Z=0 mm was within ±3%. Similarly, the deviation of the magnetic flux density in the X axis direction relative to the standard magnetic flux density at X=0 mm was also within ±3%. Thus, in both Z axis and X axis directions, the magnetic flux density within the cavity 41 was substantially uniform.

Figure 6:
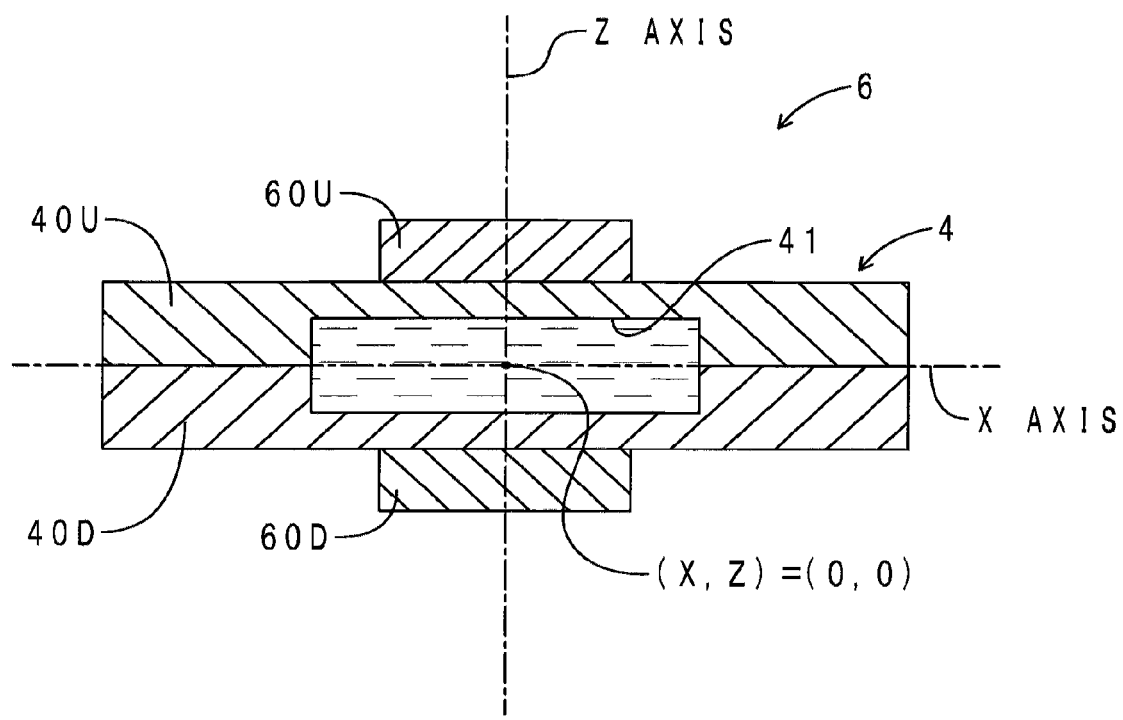
FIG. 6 is a cross-sectional view of a non-uniform magnetic field foam molding apparatus.

Here, the above measurement result of the magnetic flux density in the magnetic induction foam molding apparatus 1 and the measurement result of magnetic flux density in a foam molding apparatus in which the magnetic field is not uniform (hereinafter, referred to as "non-uniform magnetic field foam molding apparatus") are compared. In FIG. 6, a cross sectional view of a non-uniform magnetic field foam molding apparatus is shown. The members corresponding to those in FIGS. 3 and 4 are indicated with the same symbols. As shown in FIG. 6, a non-uniform magnetic field foam molding apparatus 6 includes a pair of magnets 60U, 60D and the foaming mold 4. The pair of magnets 60U, 60D are in the shape of a rectangular solid having a size of length 50 mm×width 50 mm×thickness 25.4 mm. The foaming mold 4 is interposed between the pair of magnets 60U, 60D. The foaming mold 4 includes the upper mold 40U and the lower mold 40D. Between the upper mold 40U and lower mold 40D, the cavity 41 (in a cylindrical shape having diameter 100 mm×thickness 20 mm) is defined. The cavity 41 is filled with a predetermined raw material.

Figure 7:
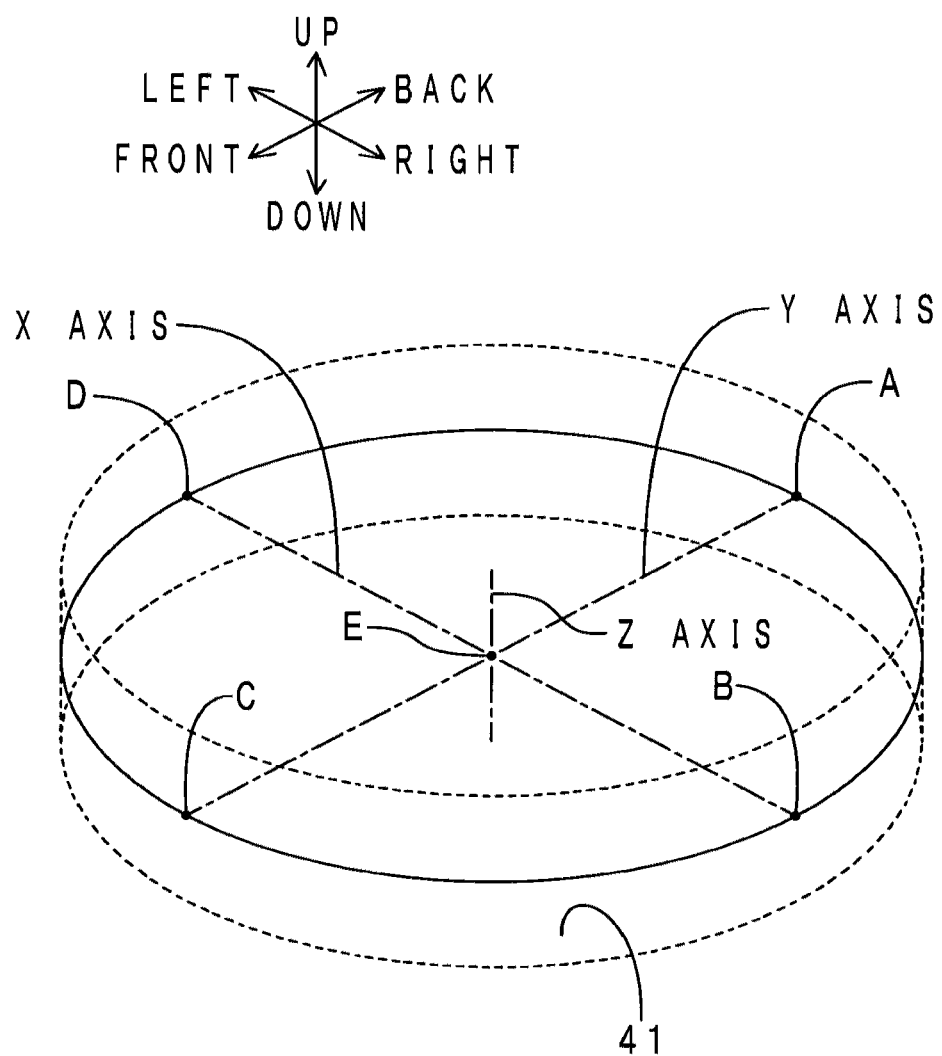
FIG. 7 is a schematic diagram showing coordinate axes in the cavity.

The coordinate axis in the non-uniform magnetic field foam molding apparatus 6 was defined as follows. In FIG. 7, the coordinate axis in the cavity 41 is shown. In FIG. 7, for the convenience of the description, the mold surface of the cavity 41 is shown with dotted lines. As shown in FIGS. 6 and 7, relative to the center of the foaming mold 4 as an origin of coordinates E (0, 0, 0), the upper-lower direction was defined as the Z axis, the left-right direction as the X axis and the front-back direction as the Y axis. In FIG. 7, the solid line indicates a virtual plane of X=0, Y=0, Z=0. The magnetic flux density was measured with respect to each face of Z=0 mm (central face of the foaming mold 4), Z=25 mm (upper face thereof) and Z=−25 mm (lower face thereof) at five points A, B, C, D, and E.

TABLE 1

| Measuring point | Magnetic flux density [mT] | | | | |
| --- | --- | --- | --- | --- | --- |
| | A | B | C | D | E |
| Z = 25 mm | 209 | 278 | 372 | 277 | 411 |
| Z = 0 mm | 132 | 142 | 162 | 135 | 200 |
| Z = −25 mm | 175 | 196 | 236 | 228 | 346 |

As shown in Table 1, for example, the deviation of the magnetic flux density in the X axis direction of Z=0 face (between at E point and at D point) was 32.5%. In addition, the deviation of the magnetic flux density at E points of respective faces in the Z axis direction was 51.3%. Thus, it is apparent that in the non-uniform magnetic field foam molding apparatus 6, the deviation of the magnetic flux density in the cavity 41 is extremely large in comparison with the magnetic induction foam molding apparatus 1 according to the present embodiment.

Next, an action and an effect of the magnetic induction foam molding apparatus according to the present embodiment is described. According to the present embodiment, between the electromagnet parts 2U and 2D, the lines of magnetic force L are generated from upper to lower. The lines of magnetic force L radiated from the lower end of the core part 20D of the lower electromagnet part 2D flow into the upper end of the core part 20U of the upper electromagnet part 2U through the yoke part 3. Thus, in the magnetic circuit constituted with the core part 20U, the cavity 41, the core part 20D and the yoke part 3, the lines of magnetic force L form a closed loop. Therefore, the leakage of the lines of magnetic force L can be suppressed and as shown in the above FIG. 5, a stable uniform magnetic field can be formed in the cavity 41. In addition, the influence of the leakage of the lines of magnetic force L on the outside is small. Further, the waste of the magnetic force is small and the apparatus itself can be downsized. Further, since the electromagnet parts 2U and 2D are used, the On/Off of the magnetic field formation can be instantaneously switched and the strength etc. of the magnetic field can be easily controlled.

EXAMPLES

Next, the present invention is more specifically described referring to Examples.

Example A (1) Manufacturing of Urethane Foam Molded Article 3 types of the urethane foam molded article containing magnetic fillers as magnetic bodies were produced. First, a urethane foam resin raw material was prepared as follows. 100 parts by weight of a polyether polyol (S-0248; manufactured by Sumika Bayer Urethane Co., Ltd. having average molecular weight of 6,000, 3 functional groups and an OH value of 28 mg KOH/g) as a polyol component, 2 parts by weight of diethylene glycol (manufactured by Mitsubishi Chemical Corporation) as a crosslinker, 2 parts by weight of water as a blowing agent, 1 part by weight of tetraethylenediamine-based catalyst (No. 31; manufactured by Kao Corporation) and 0.5 parts by weight of a silicone-based foam stabilizer (SZ-1313; manufactured by Nihon Unica Corporation) were blended to prepare a premix polyol. To the prepared premix polyol, diphenylmethanediisocyanate (MDI) (NE1320B; manufactured by BASF INOAC Polyurethanes Ltd.; having a concentration of NCO of 44.8 wt %) as a polyisocyanate component was added and the resultant mixture was mixed to prepare a urethane foam resin raw material. Here, the blend ratio between the polyol component and the polyisocyanate component (PO:ISO) was set to be PO:ISO=78.5:21.5 relative to 100% of the total weight of both components.

On the other hand, 3 types of the magnetic fillers were prepared. That is, as the first magnetic filler, a stainless steel sphere (DAP440C-30M; manufactured by Daido Steel Co., Ltd.; having a diameter of 30 µm or less, an average diameter of about 10 µm and a sphere-shape) was used; as the second magnetic filler, a stainless fiber (KC metal fiber SUS430F; manufactured by KOGI Corporation; having a diameter of about 30 µm and a length of about 2 mm) was used; and as the third magnetic filler, a copper-iron alloy powder (CFA90; manufactured by the Copper-iron alloys inc.; having a size of length about 0.5 mm×width about 0.5 mm×thickness about 0.1 mm and a thin plate-shape) was used. An aspect ratio of each filler was measured and found to be 1 of the first filler, 4444 of the second filler and 5 of the third filler.

Next, the above-prepared urethane foam resin raw material was mixed with each of the magnetic fillers to prepare a mixed material. As the magnetic filler, 121 parts by weight of the first magnetic filler and the second magnetic filler, or 129 parts by weight of the third magnetic filler were added relative to 100 parts by weight of the polyether polyol as a polyol component.

Thereafter, the mixed material was injected into the cavity (in a cylindrical shape having a size of diameter 100 mm×thickness 20 mm) of an aluminum-made foaming mold (see the above FIGS. 3 and 4) and the foaming mold was sealed. Next, in the magnetic induction foam molding apparatus shown in the above FIGS. 3 and 4, the foaming mold was placed and the foam molding was performed in a uniform magnetic field in which the magnetic flux density is substantially uniform in the cavity. After the foaming mold was placed in the magnetic induction foam molding apparatus, the foam molding was performed for the first about 2 minutes with applying the magnetic field and for the next about 5 minutes without applying the magnetic field.

Figure 8:
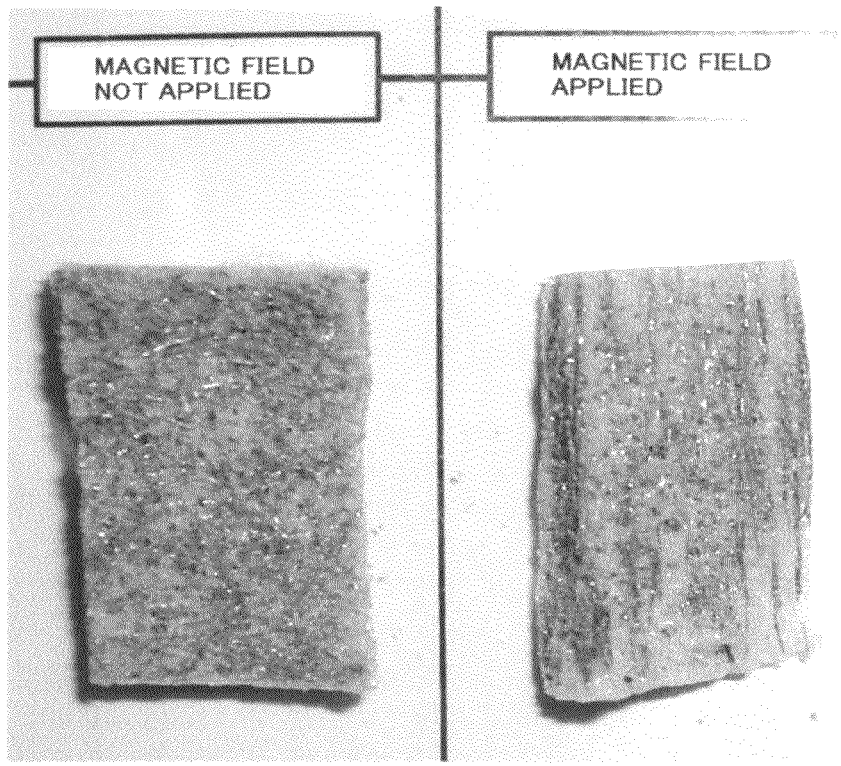
FIG. 8 is a cross-sectional photograph showing a foam molded article according to Example A2 cut in an upper-lower direction.
Figure 9:
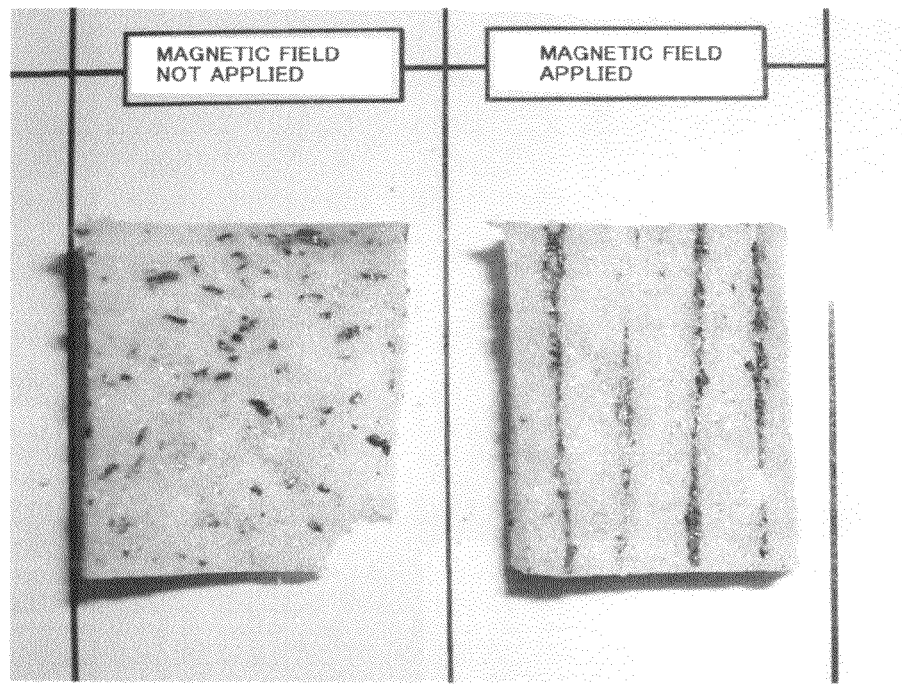
FIG. 9 is a cross-sectional photograph showing a foam molded article according to Example A3 cut in an upper-lower direction.

After the completion of the foam molding, the mold was removed to obtain 3 types of the urethane foam molded article. A urethane foam molded article in which the first magnetic filler (stainless steel sphere) was blended was obtained as a foam molded article of Example A1; a urethane foam molded article in which the second magnetic filler (stainless steel fiber) was blended was obtained as a foam molded article of Example A2; and a urethane foam molded article in which the third magnetic filler (copper-iron alloy powder) was blended was obtained as a foam molded article of Example A3. Here, every blended amount of the magnetic filler in the foam molded articles of Examples A1 to A3 was about 1 volume % relative to 100 volume % of the volume of the urethane foam molded article. The photographs of the foam molded articles of Examples A2 and A3 are shown in FIGS. 8 and 9. In the right side of FIG. 8, a cross sectional photograph produced by cutting the foam molded article of Example A2 in an upper-lower direction is shown. In the left side thereof, for the reference, a cross sectional photograph of a foam molded article produced by foam-molding the same mixed material as that in Example A2 without applying the magnetic field. Further, in the right side of FIG. 9, a cross sectional photograph produced by cutting the foam molded article of Example A3 in an upper-lower direction is shown. In the left side thereof, for the reference, a cross sectional photograph of a foam molded article produced by foam-molding the same mixed material as that in Example A3 without applying the magnetic field. As shown in FIGS. 8 and 9, when foam-molding without applying the magnetic field, the magnetic fillers are merely dispersed. Meanwhile, in the foam molded articles of Examples A2 and A3, the magnetic fillers are oriented in an upper-lower direction. In addition, the magnetic fillers are dispersed substantially uniformly also in the left-right direction (substantially perpendicular direction to the oriented direction). Though there is no photograph, in the foam molded article of Example A1, the magnetic fillers oriented and substantially uniformly dispersed were also observed. Thus, in the foam molded article of Examples A1 to A3, the magnetic fillers were not unevenly distributed and dispersed substantially uniformly through the whole foam molded article.

Figure 10:
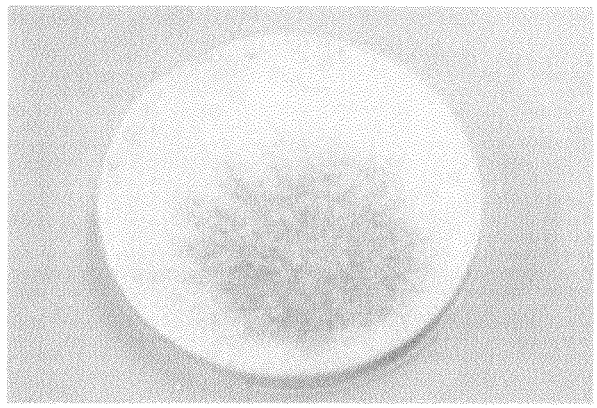
FIG. 10 is a photograph of the top view of a foam molded article according to Comparative Example A1.
Figure 11:
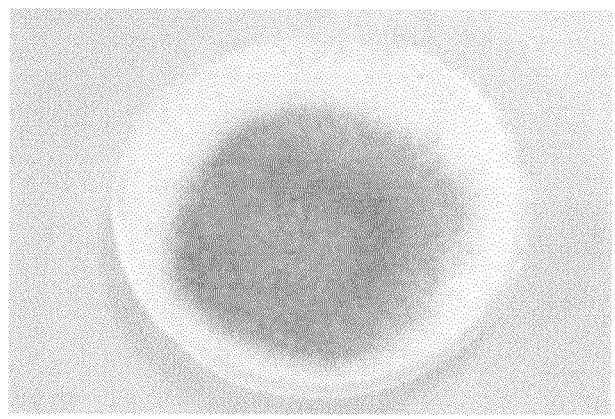
FIG. 11 is a photograph of the bottom view of the above foam molded article.
Figure 12:
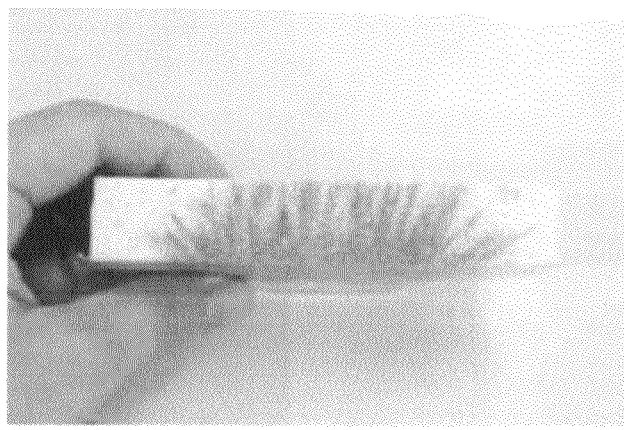
FIG. 12 is a cross-sectional photograph showing the above foam molded article cut at around the center thereof in the thickness direction thereof.

On the other hand, a mixed material containing the second magnetic filler (stainless steel fiber) was subjected to the foam molding using a non-uniform magnetic field foam molding apparatus shown in the above FIG. 6. Like the above-described foam molding, after the foaming mold was placed in the non-uniform magnetic field foam molding apparatus, the foam molding was performed for the first about 2 minutes with applying the magnetic field and for the next about 5 minutes without applying the magnetic field. A foam molded article was obtained as the urethane foam molded article of Comparative Example A1. In FIGS. 10 to 12, photographs of the foam molded article of Comparative Example A1 are shown. FIG. 10 is a top view photograph of the foam molded article. FIG. 11 is a bottom view photograph of the foam molded article. FIG. 12 is a cross sectional view photograph in the thickness direction produced by cutting the foam molded article at around the center thereof. As shown in FIGS. 10 to 12, when the foam molding is performed in a non-uniform magnetic field, the magnetic fillers are concentrated around the center of the foam molded article. In addition, the magnetic fillers are distributed more around the bottom surface than around the top surface. Thus, when the foam molding is performed in a non-uniform magnetic field, the magnetic fillers playing a role of discharging the heat become distributed unevenly corresponding to the magnetic flux density.

(2) Heat Transfer Test

Figure 13:
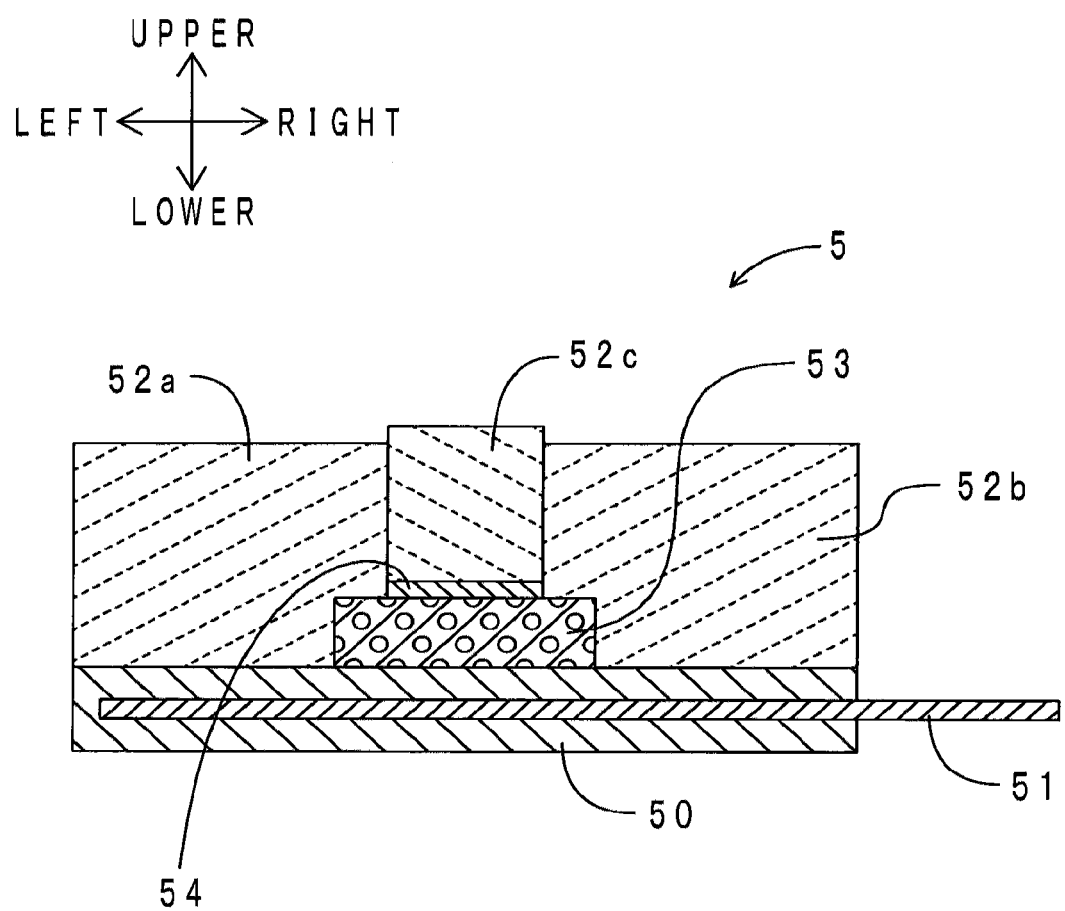
FIG. 13 is a cross-sectional view of a heating test apparatus in Example A.

Besides the foam molded articles of Examples A1 to A3, a urethane foam molded article was produced as the foam molded article of Comparative Example A2, by foam-molding the same urethane foam resin raw material as that in Examples A1 to A3, in which no magnetic filler is blended, without applying the magnetic field. The produced foam molded articles of Examples A1 to A3 and Comparative Example A2 were heated from the bottom surface side to evaluate the heat transfer performance. FIG. 13 shows a cross sectional view of a heating test apparatus.

As shown in FIG. 13, a heating test apparatus 5 includes a supporter 50, a heating plate 51 and heat insulating materials 52a, 52b, and 52c. The heating plate 51 is in a rectangular plate-shape and is supported by the supporter 50 horizontally. The heating plate 51 is temperature-controlled at around 100° C. by a heater (not shown). On the top surface of the heating plate 51, a sample (urethane foam molded article) 53 to be measured is placed. On the top surface of the sample 53, an aluminum plate 54 is placed. All of the heat insulating materials 52a, 52b, 52c are made of polyurethane foam and are placed on the top surface of the supporter 50. The heat insulating materials 52a, 52b, 52c are divided into 3 pieces and cover the sample 53 and the aluminum plate 54 for preventing the expression of them.

Figure 14:
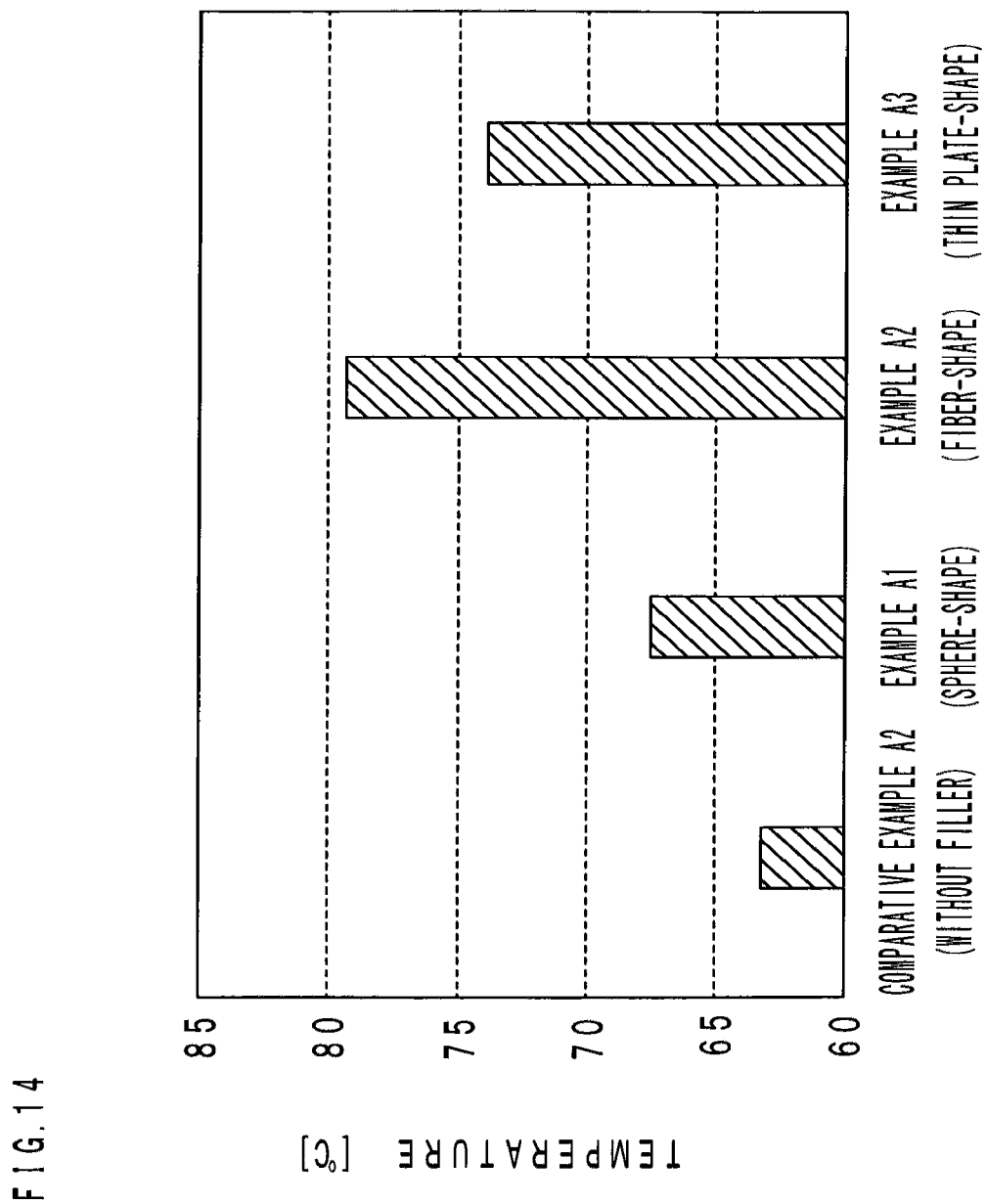
FIG. 14 is a graph showing the result of measuring the top surface temperature of each foam molded article according to Examples A1 to A3 and Comparative Example A2.

Each of the foam molded articles of Examples and Comparative Examples was retained on the heating plate 51 for about 150 minutes to measure the change with time of the top surface temperature. Here, the top surface temperature of the aluminum plate 54 was measured using a thermocouple as the top surface temperature of each of foam molded articles. In FIG. 14, the result of measuring the top surface temperature of each of foam molded articles is shown. The result shown in FIG. 14 is a result that has been corrected for temperature taking into consideration the outside air temperature. As shown in FIG. 14, all of the top surface temperatures of the foam molded articles of Examples A1 to A3 were higher than that of the foam molded article of Comparative Example A2 containing no magnetic filler. Particularly, in the foam molded articles of Examples A2 and A3 containing magnetic fillers having a shape other than a sphere shape, the top surface temperatures were higher than that of the foam molded article of Example A1 containing magnetic filler shaving asphere shape. From the result, it is apparent that when magnetic fillers having a shape other than sphere are blended, the heat transferring amount becomes larger and heat dissipation property is enhanced. Thus, the foam molded articles of Examples A1 to A3 having high heat dissipation property are suitable for, for example, a sound proof tire for reducing a noise due to the unevenness of the road surface, an engine cover placed in the engine room for reducing the noise of the engine, a side cover, a sound absorbing material for the ceiling, the pillar part, and the like in the automobile interior, a sound absorbing material for the motor of the OA (Office Automation) equipment or home electric appliances, a heat-discharging sound absorbing material for the electronic equipment such as a personal computer, a sound absorbing material for the inner and outer wall of the house etc.

(3) Measurement of Sound Absorption Coefficient

Figure 15:
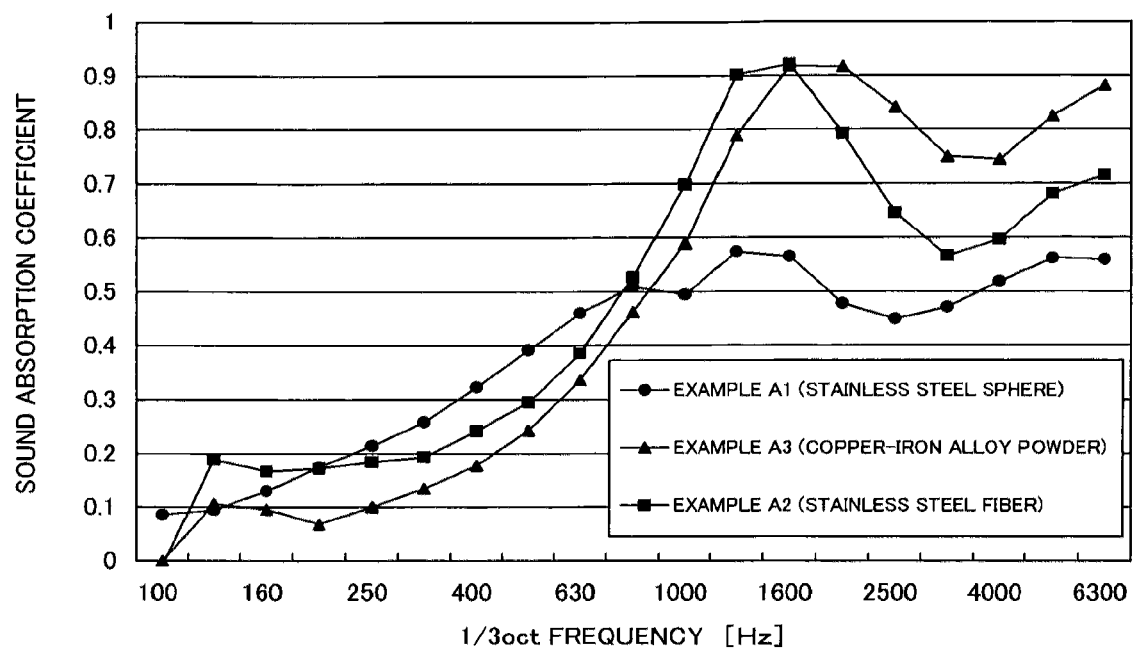
FIG. 15 is a graph showing the result of measuring the sound absorption coefficient of each foam molded article according to Examples A1 to A3.

The sound absorption coefficient of the foam molded articles of Examples A1 to A3 was measured. The sound absorption coefficient was measured according to JIS A 1405 normal incident sound absorption coefficient method. Here, the incident direction of sonic waves was set to be the same as the orientation direction of the magnetic fillers. In FIG. 15, the measurement result of the sound absorption coefficient is shown.

As shown in FIG. 15, in the foam molded articles of Examples A2 and A3, the sound absorption coefficient in a high frequency region of 1000 Hz or more was higher than that of the foam molded article of Example A1. In other words, the foam molded articles of Examples A2 and A3 exhibited a high sound absorbency in a specific frequency region. Thus, when magnetic fillers in a shape other than sphere are blended, the heat dissipation property can be enhanced without lowering the sound absorbing characteristic. Thus, as one mode of the preferable urethane foam molded article of the present invention, there can be mentioned a mode in which the urethane foam molded article has a substrate composed of polyurethane foam and magnetic fillers blended in the substrate, in which the magnetic fillers have a shape other than sphere and are oriented while they conjoin each other by at least one of a line contact and a surface contact.

Example B (1) Manufacturing of Urethane Foam Molded Article 2 types of the urethane foam molded article having a skin layer at one end or both ends of a foamed main body were produced. First, like in the above Example A (1), the urethane foam resin raw material was prepared. Here, in the present Example, in the above premix polyol, 2 parts by weight of a carbon-based pigment (FT-1576; manufactured by Dainichiseika Color & Chemicals Mfg. Co., Ltd.) was blended.

Next, in the prepared urethane foam resin raw material, an MR fluid (E-600; manufactured by Sigma Hi-Chemical Inc.) was blended to prepare a mixed material. The MR fluid was blended in an amount of 29.2 parts by weight relative to 100 parts by weight of the total of polyether polyol as a polyol component and MDI as a polyisocyanate component.

Thereafter, like the above Example A (1), the mixed material was injected into the cavity (in a cylindrical shape having a size of diameter 100 mm×thickness 20 mm) of an aluminum-made foaming mold (see the above FIGS. 3 and 4) and the foaming mold was sealed. At this time, the injecting amount of the mixed material was changed. As one type, the mixed material was injected so that, at the completion of the expansion, the foam molded article does not reach the ceiling surface of the cavity (open state). As another type, the mixed material was injected so that, at the completion of the expansion, the foam molded article reaches the ceiling surface of the cavity (closed state). In the case of the former open state, only on the lower surface of the foamed main body, the skin layer is formed. On the contrary, in the case of the latter closed state, on both upper and lower surfaces of the foamed main body, the skin layers are formed.

Next, in the magnetic induction foam molding apparatus shown in the above FIGS. 3 and 4, the foaming mold was placed and the foam molding was performed in a uniform magnetic field in which the magnetic flux density is substantially uniform in the cavity. After the foaming mold was placed in the magnetic induction foam molding apparatus, the foam molding was performed for the first about 2 minutes with applying the magnetic field and for the next about 5 minutes without applying the magnetic field.

Figure 16:
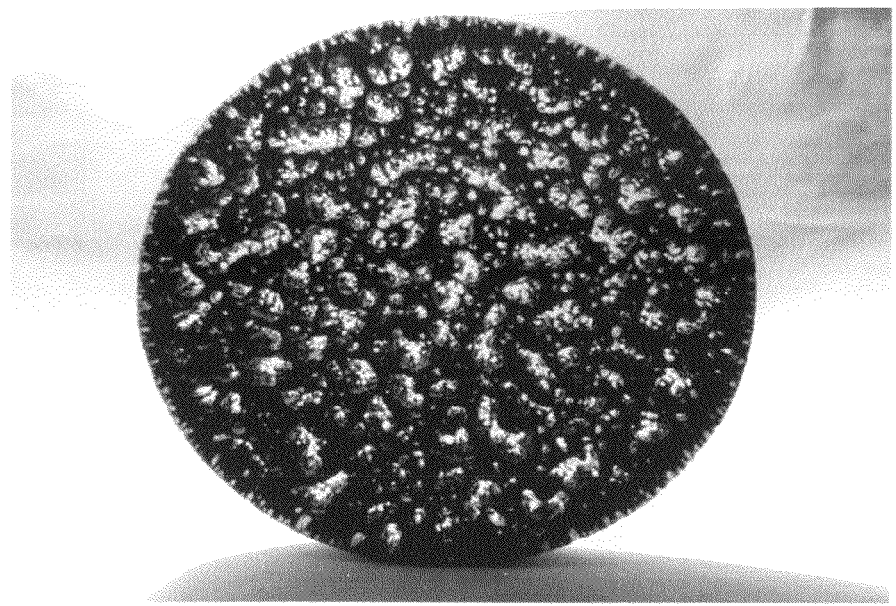
FIG. 16 is a photo graph of the top view of a foam molded article according to Example B1.
Figure 17:
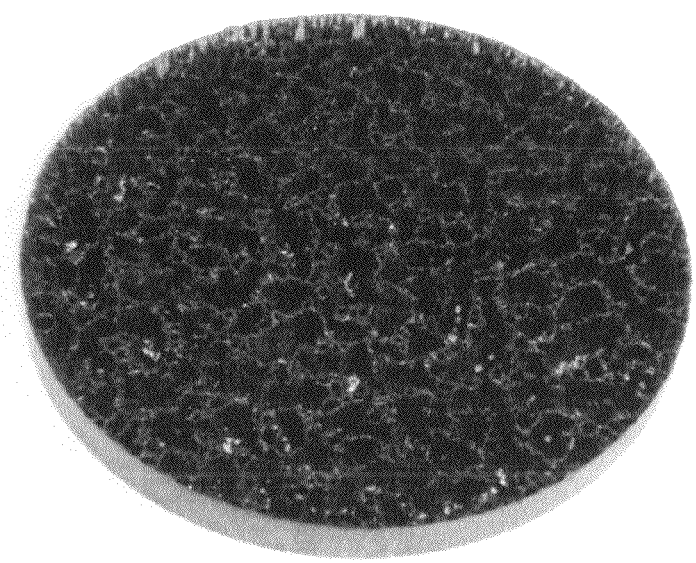
FIG. 17 is a photograph of the foam molded article according to Example B1 taken from upward of the front side.
Figure 18:
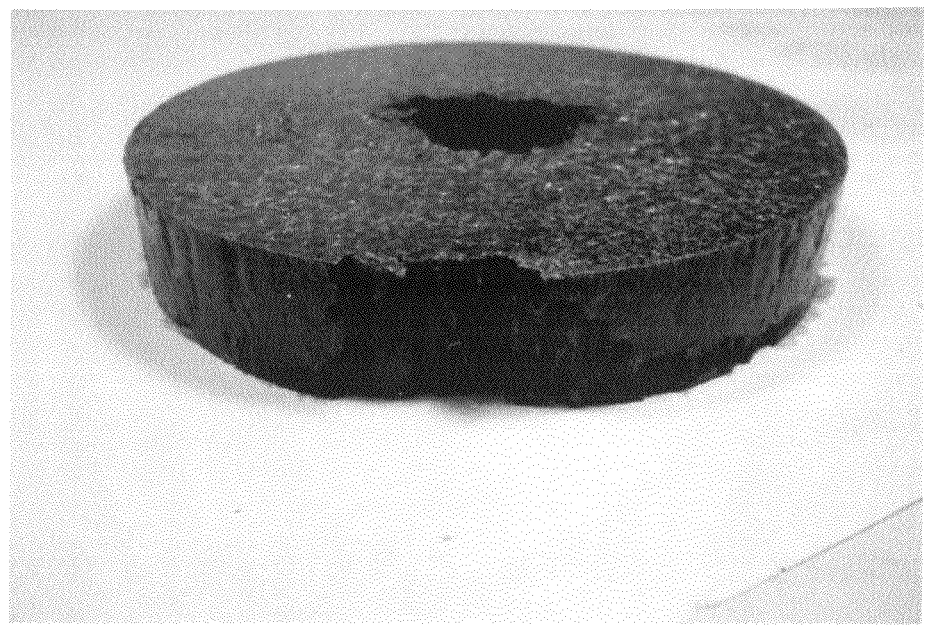
FIG. 18 is a photograph of a foam molded article according to Example B2 taken from upward of the front side.

After the completion of the foam molding, the mold was removed to obtain 2 types of the urethane foam molded article. A urethane foam molded article, in which the skin layer was formed only on the lower surface of the foamed main body, was obtained as the foam molded article of Example B1, and a urethane foam molded article, in which the skin layers were formed on the upper and lower surfaces of the foamed main body, was obtained as the foam molded article of Example B2. The photographs of the foam molded articles of Examples B1 and B2 are shown in FIGS. 16 to 18. FIG. 16 is a top view photograph of the foam molded article of Example B1. FIG. 17 is a photograph obtained by photographing the foam molded article of Example B1 from upward of the front side. FIG. 18 is a photograph obtained by photographing the foam molded article of Example B2 from upward of the front side.

As shown in FIG. 16, on the upper surface of the foam molded article of Example B1, many openings of the holes in various shapes are observed. Here, since this photograph was taken while a light was irradiated from the lower surface side (deeper side from this paper surface) of the foam molded article of Example B1, the opening of the hole appears in the photo in white color. As is apparent from the observation of the photo that the light from the lower surface side reaches the upper surface, the hole communicates in the upper-lower direction to be oriented. However, the foam molded article of Example B1 has the skin layer on the lower surface. Therefore, in the lower surface side of the foam molded article of Example B1, the hole is sealed by the skin layer. On the other hand, as shown in FIG. 17, the skin layer is not formed on the upper surface side of the foam molded article of Example B1. In the upper surface of the foam molded article of Example B1, defining walls for defining the hole are linked to each other like a labyrinth to exhibit a labyrinth pattern.

As shown in FIG. 18, the foam molded article of Example B2 has the skin layer on the upper surface side. In addition, though it is not seen in this photo, the foam molded article has the same skin layer as that on the upper surface side also on the lower surface side. Therefore, the hole communicating in the upper-lower direction is sealed by the skin layer. From the observation of the side part cross sectional view of the foam molded article of Example B2, it is apparent that the hole communicates in the upper-lower direction and is oriented. In addition, a defining wall extending in the upper-lower direction is observed as a bark.

Figure 19:
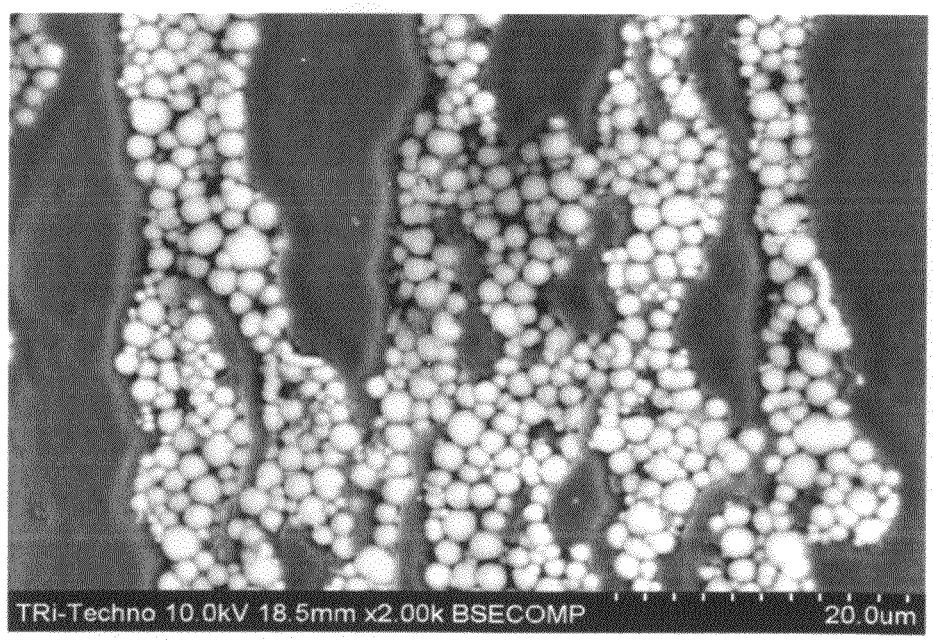
FIG. 19 is a SEM photograph of a cross-section of the foam molded article according to Example B2 (magnification power of 2000).

Further, a cross section produced by cutting the foam molded article of Example B2 in the upper-lower direction was observed using a scanning electronic microscope (SEM). In FIG. 19, a SEM photograph (magnification power of 2,000) of the cross section of the foam molded article is shown. From the SEM photo of FIG. 19, it is apparent that in the foam molded article of Example B2, the magnetic bodies are linked to each other in the upper-lower direction and are oriented. At the same time, it is also apparent that the magnetic bodies are substantially uniformly dispersed in the left-right direction (direction substantially perpendicular to the oriented direction).

Figure 20:
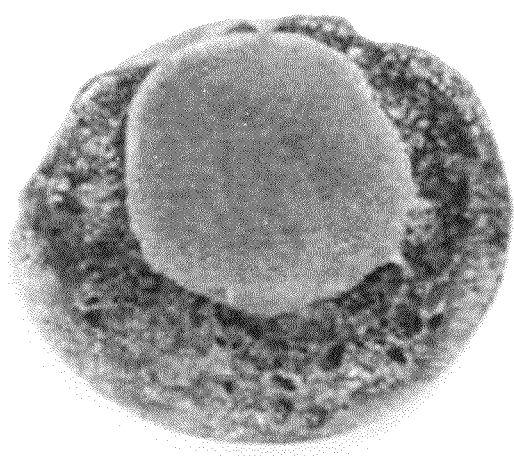
FIG. 20 is a photograph of the top view of a foam molded article according to Comparative Example B3.
Figure 21:
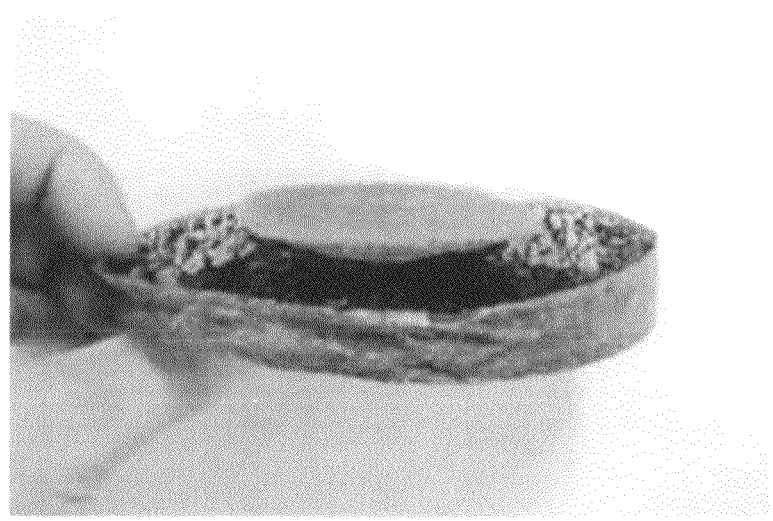
FIG. 21 is a photograph of the above foam molded article taken from upward of the front side.

On the other hand, the above mixed material prepared by mixing the urethane foam resin raw material and the MR fluid was subjected to the foam molding using the above non-uniform magnetic field foam molding apparatus shown in FIG. 6. The injecting amount of the mixed material was the same as that of the above closed state. After the foaming mold was placed in the non-uniform magnetic field foam molding apparatus, the foam molding was performed, like the above foam molding for the first about 2 minutes with applying the magnetic field and for the next about 5 minutes without applying the magnetic field. The urethane foam molded article was obtained as the foam molded article of Comparative Example B3. The photograph of the foam molded articles of Comparative Examples B3 is shown in FIGS. 20 and 21. FIG. 20 is a top view photograph of the foam molded article. FIG. 21 is a photograph obtained by photographing the foam molded article from upward of the front side. As shown in FIGS. 20 and 21, when the foam molding was performed in the non-uniform magnetic field, only at around the center in which the magnetic flux density is large, the hole communicating in the upper-lower direction and oriented was formed. Other parts than the part at around the center did not exhibit the shape of the foam molded article. Thus, when the mixed material in which the MR fluid was blended was subjected to the foam molding in the non-uniform magnetic field, the foam molded article having the hole oriented to communicate from one end to another end could not be obtained.

(2) Load Test

Figure 22:
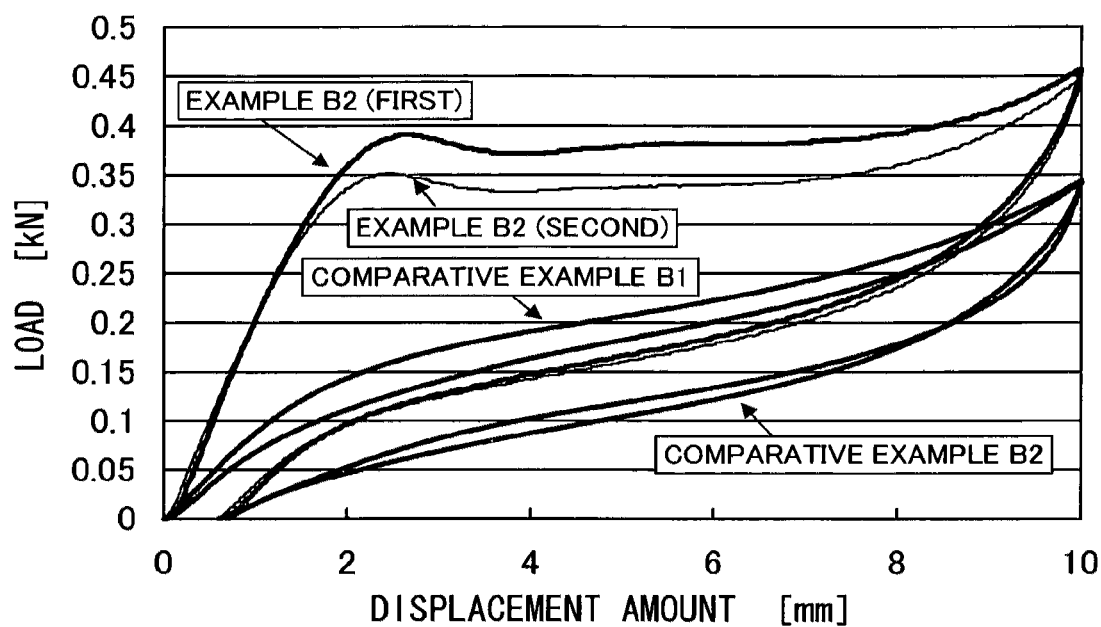
FIG. 22 is a load-displacement curve for each foam molded article according to Example B2 and Comparative Examples B1 and B2.

By applying a load to the produced foam molded article of Example B2 from the above (the orientation direction of the hole) to the upper surface thereof (having a diameter of 100 mm, an area of about 78.5 cm$^2$), the amount of displacement relative to the load was measured. In addition, for the reference, the urethane foam resin raw material having the same composition as that of the above urethane foam resin raw material and of which amount was enlarged by the amount for the weight of the MR fluid in the above mixed material was subjected to the foam molding without applying the magnetic field to produce the urethane foam molded article (hereinafter, referred to as "foam molded article of Comparative Example B1"). In addition, the same mixed material As the above mixed material was subjected to the foam molding without applying the magnetic field to produce the urethane foam molded article (hereinafter, referred to as "foam molded article of Comparative Example B2"). Needless to say in the foam molded article of Comparative Example B1 in which the MR fluid was not blended, also in the foam molded article of Comparative Example B2 produced by foam molding even in which the MR fluid was blended without applying the magnetic field, the hole oriented to communicate from one end to another end was not formed. Also with respect to these foam molded articles of Comparative Example B1, B2, the amount of displacement relative to the load was measured. Here, one cycle of the load test includes from applying a predetermined load to removing the load. In FIG. 22, the load-displacement curve for each foam molded article is shown.

Figure 23:
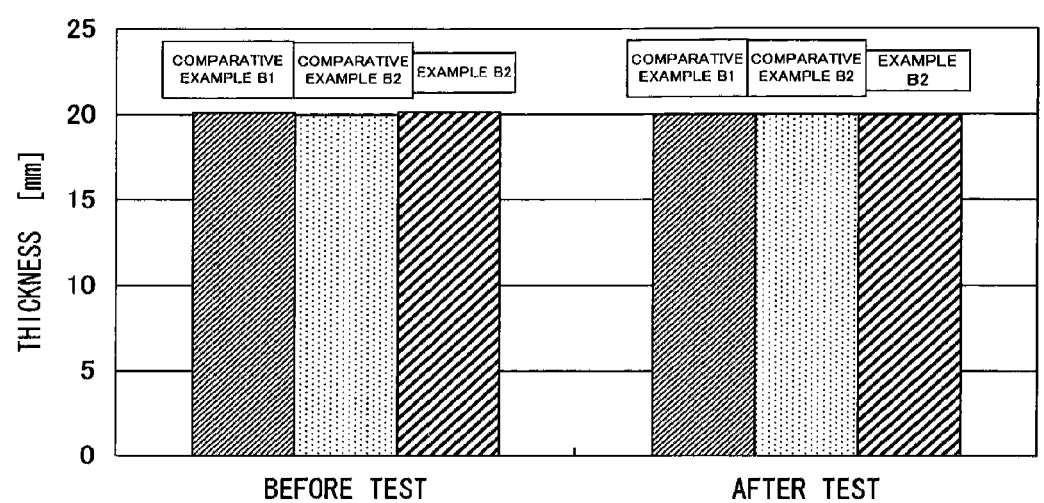
FIG. 23 shows the result of measuring the thickness before and after the loading test for each foam molded article according to Example B2 and Comparative Examples B1 and B2.

As shown in FIG. 22, it is apparent that the foam molded article of Example B2 has a rigidity higher than those of the foam molded article of Comparative Examples B1, B2. In addition, in the foam molded article of Example B2, when the amount of displacement exceeded 2 mm, the load was temporarily lowered and energy attenuation was observed. Nonetheless, the foam molded article of Example B2, like the foam molded articles of Comparative Examples B1, B2, was returned to the substantially original shape when the load was removed. Further, with respect to the foam molded article of Example B2, after 1 hour from one cycle load test, the same load test was performed (second load test). The load-displacement curve of the second load test is also shown in FIG. 22. As shown in FIG. 22, it is apparent that though the maximum load became slightly smaller, high rigidity, energy attenuation performance, and restorability are maintained. In addition, for evaluating the restorability, before and after one cycle of the load test, the thickness of each foam molded article was measured. The result thereof is shown in FIG. 23. As shown in FIG. 23, in each of the foam molded articles, almost no change in the thickness was observed between before the load test and after the load test.

Thus, according to the foam molded article of Example B2, compounded characteristics of inherent urethane foam material-derived characteristics and characteristics obtained by a specific hole structure are brought out. More specifically, the foam molded article of Example B2 exhibits both energy attenuation performance and high rigidity. Therefore, it is useful, for example as an impact absorber.

(3) Anisotropy Test

Figure 24:
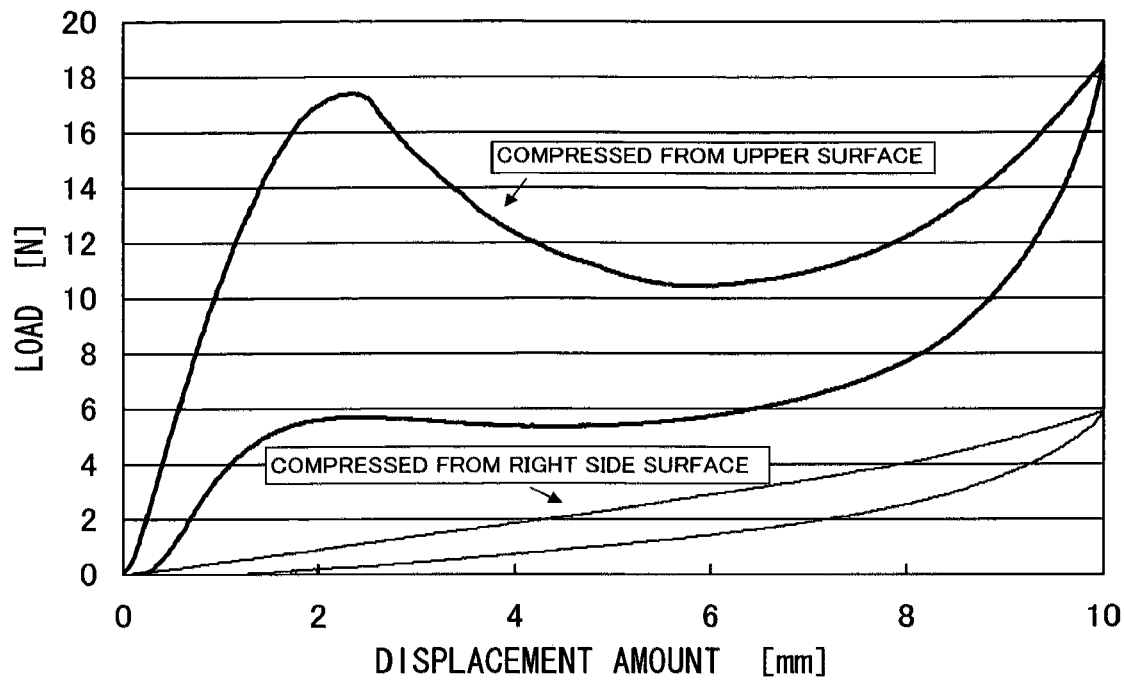
FIG. 24 is a load-displacement curve for a sample produced from the foam molded article according to Example B2.

From the above foam molded article of Example B2, a sample in a block shape having a size of 20 mm×20 mm×20 mm was cut out. On the upper and lower surfaces of the sample, the skin layer is formed. To the upper surface (20 mm×20 mm=4 cm$^2$) of the sample, a load was applied to measure the amount of displacement relative to the load (compression direction was the same as the orientation direction of the hole). Similarly, to the right side surface (20 mm×20 mm=4 cm$^2$) of the sample, a load was applied to measure the amount of displacement relative to the load (compression direction was the substantially perpendicular direction relative to the orientation direction of the hole). In FIG. 24, the load-displacement curve for each measurement is shown in FIG. 24.

Figure 25:
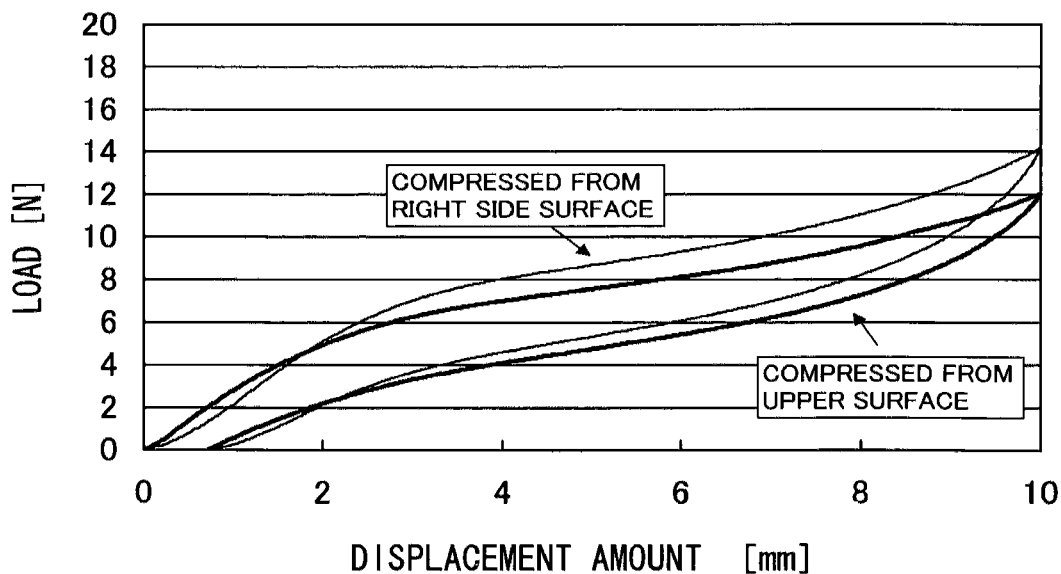
FIG. 25 is a load-displacement curve for a sample produced from the foam molded article according to Comparative Example B1.
Figure 26:
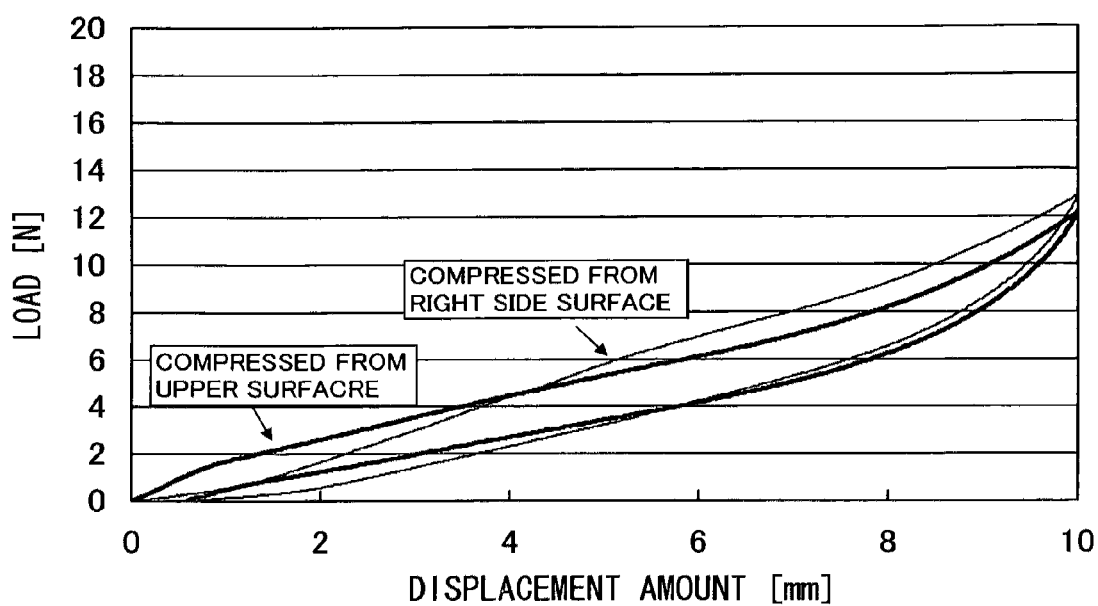
FIG. 26 is a load-displacement curve for a sample produced from the foam molded article according to Comparative Example B2.

For the reference, a sample in a block shape having a size of 20 mm×20 mm×20 mm was similarly cut out from the above foam molded articles of Comparative Examples B1, B2. To the upper surface of the sample, a load was applied to measure the amount of displacement relative to the load. In addition, to the right side surface of the sample, a load was applied to measure the amount of displacement relative to the load. In FIGS. 25 and 26, the load-displacement curve for each measurement is shown.

As shown in FIG. 24, it is apparent that the sample of Example B2 has high rigidity in the upper-lower direction (orientation direction of hole). In addition, the static spring constant when the displacement was 2 mm (compressing ratio is 10%) by the compression from the upper surface and the static spring constant when the displacement was 2 mm (compressing ratio is 10%) by the compression from the right side surface, were compared and it was found that the former was 18.83 times the latter. On the other hand, as shown in FIGS. 25 and 26, in the samples of Comparative Examples B1, B2, there was almost no difference in the rigidity due to the difference in the compression direction. With respect to each sample, like in Example B2, the static spring constant when the sample is compressed from the upper surface and the static spring constant when the sample is compressed from the right side surface were compared. As the result, with respect to the sample of Comparative Example B1, the former was 0.99 times the latter, and with respect to the sample of Comparative Example B2, the former was 1.58 times the later. Thus, it is apparent that in the foam molded article of Example B2, the characteristics in the orientation direction of the hole and the characteristics in the substantially perpendicular direction to the orientation direction differ largely from each other. Therefore, such a foam molded article is useful, for example, as a rubber member of the upper support for the suspension in which flexibility in the upper-lower direction of the automobile is required from the viewpoint of the ride quality and rigidity in the horizontal direction is required from the viewpoint of the driving stability.

Example C (1) Manufacturing of Urethane Foam Molded Article

A urethane foam molded article having magnetic bodies oriented in a spike shape from one end surface into outer-inner direction was produced. First, as the magnetic body-containing fluid, an MR fluid (E-600; manufactured by Sigma Hi-Chemical Inc.) was prepared. Next, like in the above Example A (1), the urethane foam resin raw material was prepared.

Next, the MR fluid was injected into the cavity (in a cylindrical shape having a size of diameter 100 mm×thickness 20 mm) of an aluminum-made foaming mold (see the above FIGS. 3 and 4) the same as that in the above Example A (1). The MR fluid was spread substantially uniformly over the bottom surface of the cavity to such a degree that the bottom surface is concealed. The thickness of the MR fluid was about 1 mm. Next, on the MR fluid, the prepared urethane foam resin raw material was injected and the mold was closed. Thereafter, in the magnetic induction foam molding apparatus shown in the above FIGS. 3 and 4, the foaming mold was placed and the foam molding was performed in a uniform magnetic field in which the magnetic flux density is substantially uniform in the cavity. After the foaming mold was placed in the magnetic induction foam molding apparatus, the foam molding was performed for the first about 2 minutes with applying the magnetic field and for the next about 5 minutes without applying the magnetic field.

Figure 27:
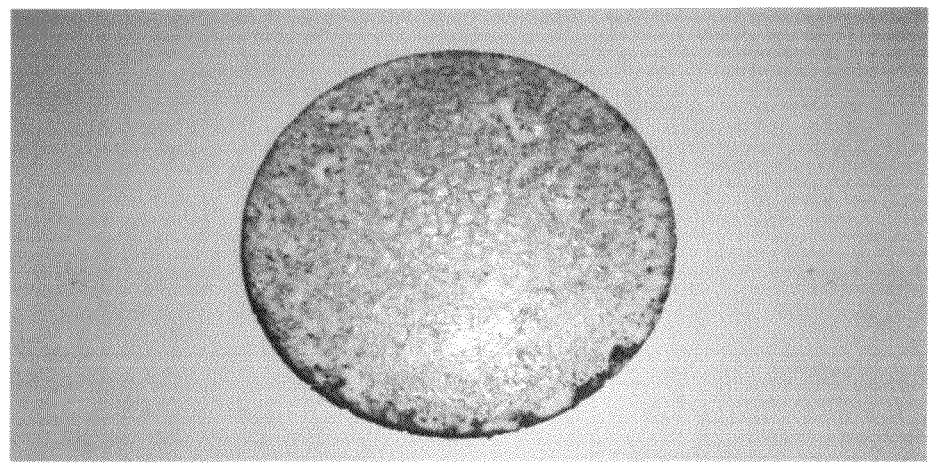
FIG. 27 is a photograph of a lower end surface of a foam molded article according to Example C.
Figure 28:
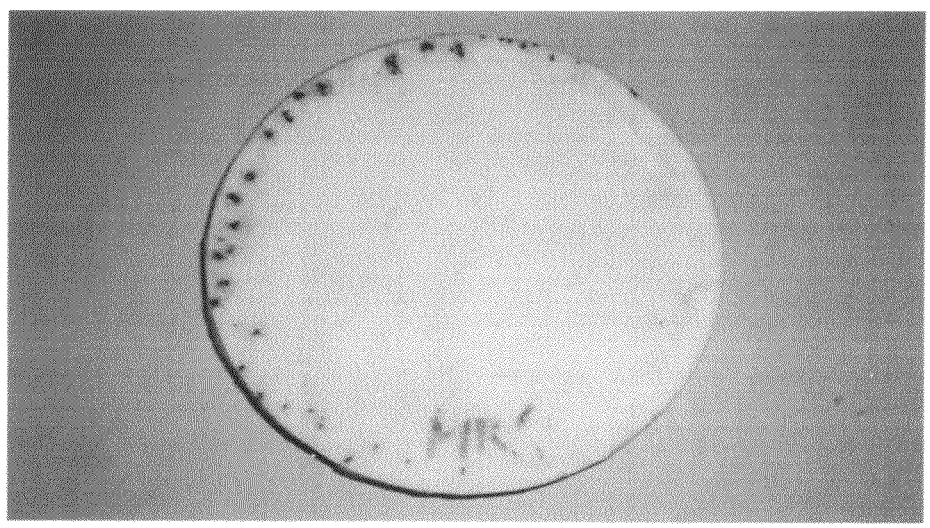
FIG. 28 is a photograph of an upper end surface of the above foam molded article.
Figure 29:
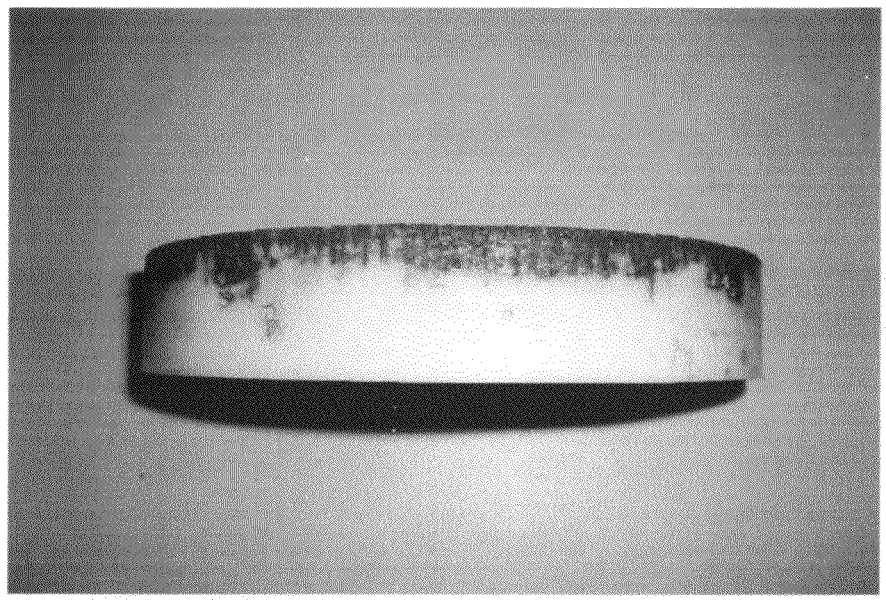
FIG. 29 is a photograph of a side surface of the above foam molded article.
Figure 30:
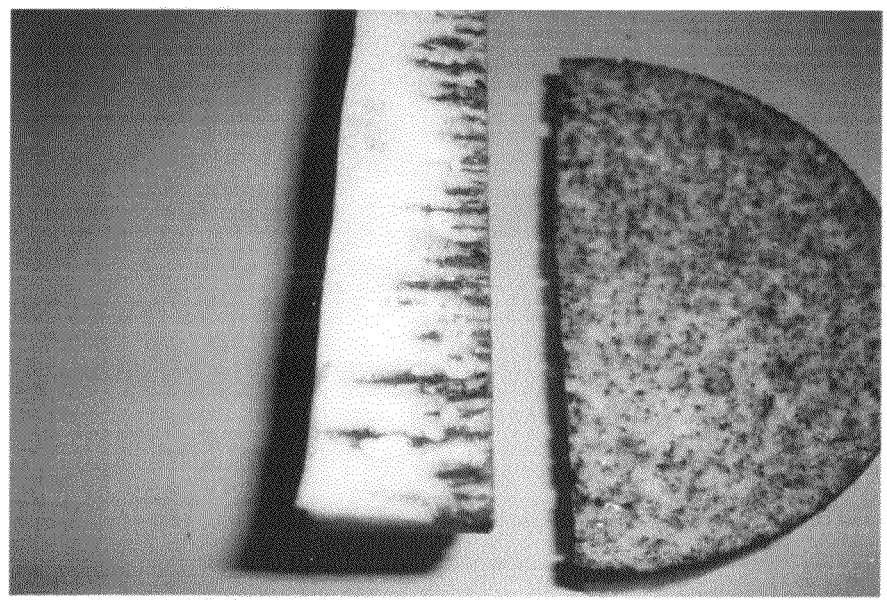
FIG. 30 is a cross-sectional photograph of the above foam molded article cut in an upper-lower direction.

After the completion of the foam molding, the mold was removed to obtain the urethane foam molded article. On the upper and lower surfaces of the obtained urethane foam molded article, the skin layer was formed. Hereinafter, this urethane foam molded article is referred to as the foam molded article of Example C. Photographs of the foam molded article of Example C are shown in FIGS. 27 to 30. FIG. 27 is a photograph of the lower end surface of the foam molded article. FIG. 28 is a photograph of the upper end surface of the foam molded article. FIG. 29 is a photograph of the side surface of the foam molded article. Here, the side surface photograph of FIG. 29 was photographed by turning the lower end surface of the foam molded article to the upper side. FIG. 30 is a sectional view photograph of the foam molded article prepared by cutting the foam molded article in the upper-lower direction. In the cross sectional view photograph of FIG. 30, the lower end surface of the foam molded article is arranged facing the right side. Here, in FIG. 30, the photograph of the lower end surface of the cut foam molded article is also shown.

As shown in FIG. 27, in the lower end surface of the foam molded article of Example C, the black magnetic bodies are dispersed. Therefore, the lower end surface looks dark as a whole. On the contrary, as shown in FIG. 28, in the perimeter of the upper end surface of the foam molded article, a slight amount of the black magnetic bodies is seen, however, the upper end surface assumes white color. In addition, the texture of the upper end surface was fine and the texture of the lower end surface was rough. Thus, the concentration of the magnetic bodies differs between in the lower end surface and in the upper end surface. Similarly, the cell structure also differs between in the lower end surface and in the upper end surface. This is apparent also from FIGS. 29 and 30. In other words, as shown in FIG. 29, the magnetic bodies are concentrated around the lower end surface. In addition, from the cross sectional photograph of FIG. 30, it is apparent that the magnetic bodies are oriented from the lower end surface to the upper end surface in a spike-shape. Further, the magnetic bodies concentrated around the lower end surface are substantially uniformly dispersed in the substantially perpendicular direction to the orientation direction, that is, in the cross section in the direction perpendicular to the axis direction. Here, the size of the cell around the lower end surface in which the magnetic bodies are oriented was larger than the cell diameter around the upper end surface. Thus, it was confirmed that in the foam molded article of Example C, the magnetic bodies are oriented in a spike-shape from the lower end surface to the upper end surface and the cell structure was different between on the lower end surface side in which many magnetic bodies were distributed and on the upper end surface side in which few magnetic bodies were distributed. In addition, it was also confirmed that in the foam molded article of Example C, the oriented magnetic bodies were dispersed substantially uniformly in the substantially perpendicular direction to the orientation direction.

(2) Measurement of Sound Absorption Coefficient

Figure 31:
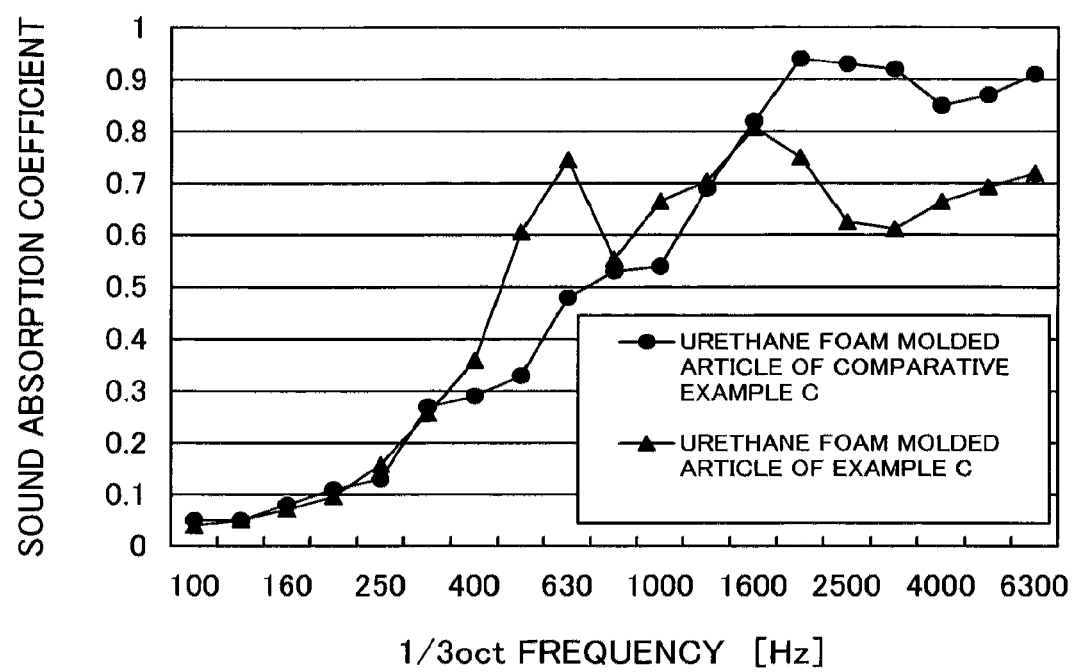
FIG. 31 is a graph showing the result of measuring the sound absorption coefficient of each foam molded article according to Example C and Comparative Example C.

The sound absorption coefficient of the foam molded articles of Example C was measured. The sound absorption coefficient was measured according to JIS A 1405 normal incident sound absorption coefficient method. Sonic waves were caused to enter from the upper end surface side in which there were few magnetic bodies. In addition, for the reference, the foam molded article was produced without using the MR fluid by subjecting the same urethane foam resin raw material as the above to the foam molding without applying the magnetic field (hereinafter, referred to as the foam molded article of Comparative Example C). Also, with respect to the foam molded article of Comparative Example C, the sound absorption coefficient was measured. In FIG. 31, the measurement result of the sound absorption coefficient is shown.

As shown in FIG. 31, in the foam molded article of Example C, the sound absorption coefficient particularly in a low frequency region of 500 to 800 Hz was higher than that of the foam molded article of Comparative Example C. In addition, in a low frequency region of 500 to 800 Hz and in a high frequency region of 1,250 to 2,000 Hz, 2 peaks of the sound absorption coefficient appeared. Thus, the foam molded article of Example C has particular sound absorbing characteristics due to the difference between the cell structures of the upper end surface side and of the lower end surface side. Therefore, it is suitable for, for example, an engine cover or a side cover which are placed in the engine room of the vehicle for reducing the noise of the engine, a dash silencer for suppressing the propagation of the noise from the engine room to the automobile interior, a sound absorbing material for the ceiling, the pillar part, or the like in the automobile interior, and further a sound absorbing material for the inner and outer wall of the house etc.

Example D (1) Manufacturing of Urethane Foam Molded Article

The urethane foam molded articles were produced using 2 types of foaming molds having different surface roughness of the heat transferring surface mold face. First, like in the above Example A (1), the urethane foam resin raw material was prepared. Here, in the present Example, in the above premix polyol, 2 parts by weight of a carbon-based pigment (FT-1576; manufactured by Dainichiseika Color & Chemicals Mfg. Co., Ltd.) was blended.

Next, in the prepared urethane foam resin raw material, the magnetic fillers were mixed to prepare the mixed material. As the magnetic fillers, the stainless steel fiber (aspect ratio=4444) used as the second magnetic filler in the above Example A (1) was used. The magnetic fillers were blended in an amount of 121 parts by weight relative to 100 parts by weight of the polyether polyol as a polyol component.

Figure 32:
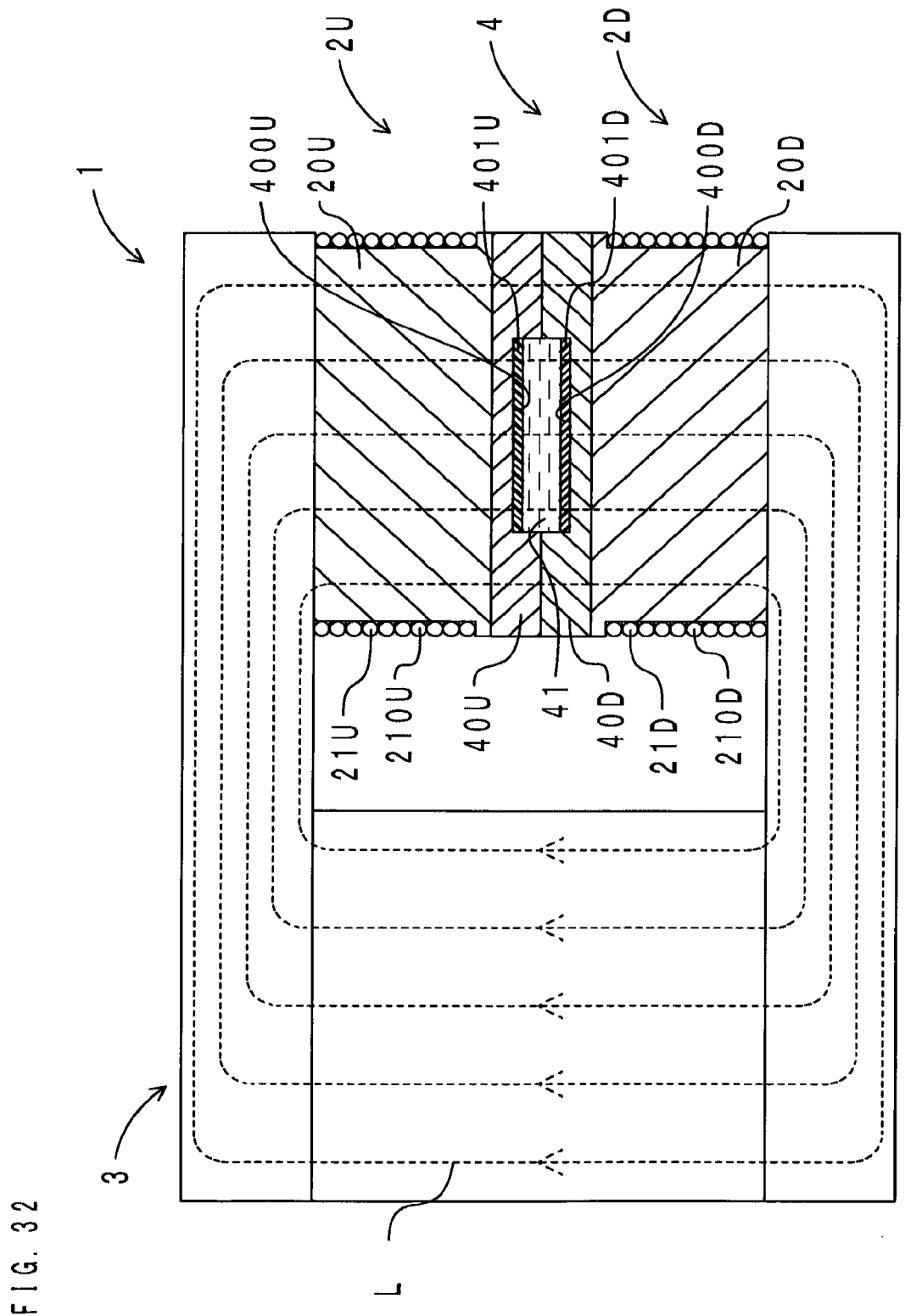
FIG. 32 is a partial cross-sectional view of the magnetic induction foam molding apparatus used in the manufacturing of the foam molded article according to Example D.

As the first foaming mold, a foaming mold having a surface roughness of the heat transferring surface mold face of 0.5 μm or less was used. In the cavity of this foaming mold, the mixed material was injected and the foaming mold was sealed. Thereafter, the foaming mold was placed in the magnetic induction foam molding apparatus and the foam molding was performed. In FIG. 32, the partial cross sectional view of the magnetic induction foam molding apparatus is shown. Here, the members corresponding to those in the above FIGS. 3 and 4 are indicated with the same symbols. The difference between the magnetic induction foam molding apparatus shown in FIG. 32 and that shown in the above FIGS. 3 and 4 is only in the foaming mold. Therefore, here only the difference is described.

As shown in FIG. 32, the foaming mold 4 includes the upper mold 40U and the lower mold 40D. The foaming mold 4 is interposed between the core part 20U of the electromagnet part 2U and the core part 20D of the electromagnet part 2D. The upper mold 40U is in a prism-shape. On the bottom surface of the upper mold 40U, a concave portion 400U in a cylinder-shape is formed. On the upper bottom surface of the concave portion 400U, a circle-shaped PET film for mold release 401U (Cerapeel (registered trade name), Grade Q; manufactured by Toray Advanced Film Co., Ltd.; having a thickness of about 145 μm) is disposed. The surface roughness of the PET film for mold release 401U was measured using a roughness gauge (SURFCOM (registered trade name) SP-828A; manufactured by Tokyo Seimitsu Co., Ltd.) and found to be Ra=0.08 μm. The PET film for mold release 401U becomes the heat transferring surface mold face. Similarly, the lower mold 40D is also in a prism-shape. On the upper surface of the lower mold 40D, the cylinder-shaped a concave portion 400D is formed. On the lower bottom surface of the concave portion 400D, a PET film for mold release 401D (the same as the 401U) is disposed. The PET film for mold release 401D becomes the heat transferring surface mold face. Here, in FIG. 32, for the convenience of the description, the thicknesses of the PET films for mold release 401U, 401D are described in an exaggerated form.

The upper mold 40U and the lower mold 40D are placed so that the openings of the concave portions 400U, 400D of the upper mold 40U and lower mold 40D face to each other. Between the upper mold 40U and the lower mold 40D, by uniting the concave portions 400U and 400D, the cavity 41 is zoned. In the cavity 41, the above mixed material is filled.

In the cavity 41 of the foaming mold 4, a uniform magnetic field is formed by the lines of magnetic force L substantially parallel from upper to lower. The magnetic flux density in the cavity 41 was about 200 mT. After the foaming mold 4 was placed in the magnetic induction foam molding apparatus 1, the foam molding was performed for the first about 2 minutes with applying the magnetic field and for the next about 5 minutes without applying the magnetic field.

After the completion of the foam molding, the mold was removed to obtain the columnar-shaped urethane foam molded article having heat transferring surfaces as the upper and lower surfaces. The obtained urethane foam molded article was referred to as the foam molded article of Example D. The blending amount of the magnetic fillers in the foam molded article of Example D was 1 volume % relative to 100 volume % of the volume of the urethane foam molded article.

As the second foaming mold, a foaming mold in which the PET film for mold release 401U, 401D is not disposed was used. This foaming mold is the same as that used in the above Example A (1) (see the above FIGS. 3 and 4). In this case, the upper bottom surface of the concave portion 400U formed on the lower surface of the upper mold 40U and the lower bottom surface of the concave portion 400D formed on the upper surface of the lower mold 40D become the heat transferring surface mold faces. The surface roughness of the upper bottom surface of the concave portion 400U and the lower bottom surface of the concave portion 400D was measured using the roughness gauge (the same as the above) and found to be Ra=0.66 μm. The obtained urethane foam molded article was referred to as the foam molded article of Comparative Example D.

(2) Measurement of Glossiness of Heat Transferring Surface

Figure 33:
FIG. 33 is a photograph of the top view of a foam molded article according to Example D.
Figure 34:
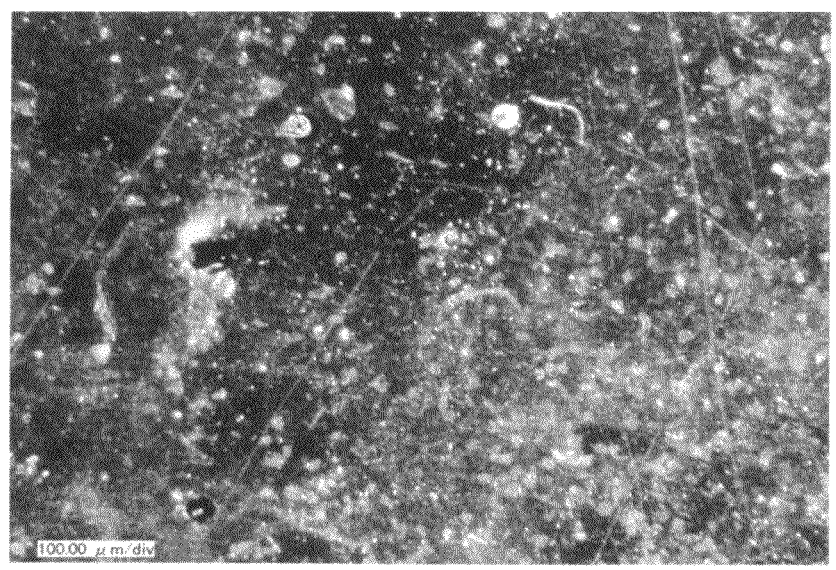
FIG. 34 is an enlarged photograph of an upper surface of the above foam molded article taken by a microscope (magnification power of 175).
Figure 35:
FIG. 35 is a photo graph of the top view of a foam molded article according to Comparative Example D.
Figure 36:
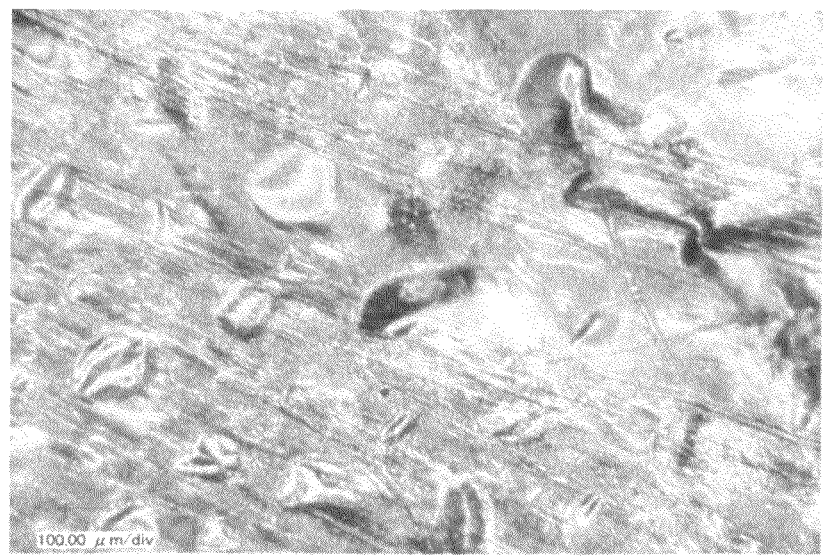
FIG. 36 is an enlarged photograph of the upper surface of the above foam molded article taken by a microscope (magnification power of 175).

First, in FIGS. 33 to 36, the photographs of the heat transferring surfaces (upper surface) of the foam molded articles of Example D and Comparative Example D. FIG. 33 shows the photograph of the upper surface of the foam molded article of Example D and FIG. 34 shows an enlarged photograph (magnification power of 175) of the upper surface of the foam molded article photographed by a microscope. Further, FIG. 35 shows the photograph of the upper surface of the foam molded article of Comparative Example D and FIG. 36 shows an enlarged photograph (magnification power of 175) of the upper surface of the foam molded article photographed by a microscope. When FIG. 33 is compared with FIG. 35, it is apparent that the foam molded article of Example D has more glossiness. In addition, when FIG. 34 is compared with FIG. 36, the concave-convex of the upper bottom surface of the upper mold concave portion is not transferred on the upper surface of the foam molded article of Example D. On the other hand, the concave-convex of the upper bottom surface of the upper mold concave portion is transferred on the upper surface of the foam molded article of Comparative Example D.

Next, the glossiness of the upper surfaces of both foam molded articles was measured. For measuring the glossiness, a digital angle changing glossmeter (UGV-5K; manufactured by Suga Testing Machine Co., Ltd.; (incident angle: 60°)) was used. As the result, while the glossiness of the upper surface of the foam molded article of Example D was 17.1%, the glossiness of the upper surface of the foam molded article of Comparative Example D was 9.5%. In other words, the glossiness of the upper surface of the foam molded article of Example D was 1.8 times the glossiness of the upper surface of the foam molded article of Comparative Example D. Thus, by preparing the foaming mold having a surface roughness of the heat transferring surface mold face of 0.5 µm or less, a heat transferring surface having a glossiness of 10% or more could be molded.

(3) Measurement of Thermal Conductivity

The thermal conductivity of the foam molded articles of Example D and Comparative Example D was measured. For measuring the thermal conductivity, a hot disc method thermophysical properties measuring apparatus (TPA-501; manufactured by Kyoto Electronics Manufacturing Co., Ltd.) was used. For the measurement of the thermal conductivity, each 2 pieces of the foam molded articles of Example D and Comparative Example D were prepared. Then, each pair of the foam molded articles were placed such that the heat transferring surfaces face each other and a sensor of the above measuring apparatus was interposed therebetween to measure the thermal conductivity. According to the present measurement, the sensor is contacted with the heat transferring surface, so that the surface condition of the heat transferring surface is reflected in the measured value. As the result of the measurement, the thermal conductivity of the foam molded article of Example D was found to be 0.12 W/(m×K) and the thermal conductivity of the foam molded article of Comparative Example D was found to be 0.10 W/(m×K). In other words, the thermal conductivity of the foam molded article of Example D was 1.2 times that of Comparative Example D. In Table 2, the thermal conductivity and glossiness of the heat transferring surface of the foam molded article and the surface roughness of the heat transferring surface mold face of the used foaming mold in Example D and Comparative Example D are shown together.

TABLE 2

| | Example | Comparative Example |
|---|---|---|
| Foaming mold (heat transferring surface mold face) surface roughness Ra (µm) | 0.08 | 0.66 |
| Glossiness of heat transferring surface (%) | 17.1 | 9.5 |
| Thermal conductivity (W/(m × K)) | 0.12 | 0.10 |

By the way, the thermal conductivity (theoretical value) of the urethane foam molded article containing no magnetic bodies is 0.03 W/(m×K). By comparing the above actual value with this theoretical value, it is apparent that the thermal conductivity is enhanced by incorporating oriented magnetic bodies and is further enhanced by causing the glossiness of the heat transferring surface crossing the orientation direction of the magnetic bodies to be 10% or more. When the glossiness of the heat transferring surface is 10% or more, the contacting area between the heat transferring surface and the opposite member becomes large, so that the heat quantity transferred between them becomes large. Therefore, it is considered that the heat transfer property enhancing effect by the orientation of the magnetic bodies is thoroughly exerted and the heat transfer property of the whole urethane foam molded article is further enhanced.

As described above, the foam molded article of Example D can be used in wide fields such as automobile, electronics equipment, and building like the foam molded articles of the above Examples A1 to A3. In other words, it is suitable for a sound proof tire, an engine cover or a side cover placed in the engine room of the vehicle, a sound absorbing material for the ceiling, the pillar part, or the like in the auto mobile room, a sound absorbing material for the motor of the OA equipment or home electric appliances, a heat-discharging sound absorbing material for the electronic equipment such as a personal computer, a sound absorbing material for the inner and outer wall of the house etc.

What is claimed is:

1. A urethane foam molded article comprising:
    magnetic bodies each formed of a number of magnetic body particles or magnetric filters that are conjoined, connected in a chain shape, and arranged in a line form in an oriented direction, which is a longitudinal direction along lines of a magnetic field, wherein
    the magnetic bodies are substantially uniformly dispersed in a substantially perpendicular direction to the oriented direction thereof, and
    the urethane foam molded article is produced by performing a foam molding using a foaming mold in which a uniform magnetic field is formed in a cavity.

2. The urethane foam molded article according to claim 1, wherein
    the magnetic bodies comprise magnetic fillers; and
    the magnetic fillers have a shape other than sphere and are oriented while they conjoin each other by at least one of a line contact and a surface contact.

3. The urethane foam molded article according to claim 1, wherein a heat transferring surface for transferring heat by contacting with an opposite member is placed so as to cross the orientation direction of the magnetic bodies and the heat transferring surface has a glossiness of 10% or more.

4. A urethane foam molded article comprising:
magnetic bodies each formed of a number of magnetic body particles that are conjoined, connected in a chain shape, and arranged in a line form in an oriented direction, which is a longitudinal direction along lines of a magnetic field, wherein
the magnetic bodies are substantially uniformly dispersed in a substantially perpendicular direction to the oriented direction thereof, the magnetic bodies being oriented in a shape that has a gradual reduction in concentration from a lower end surface to an upper end surface of the urethane foam molded article, where a cell structure is varied in the orientation direction of the magnetic bodies, and
the urethane foam molded article is produced by performing a foam molding using a foaming mold in which a uniform magnetic field is formed in a cavity.

* * * * *